US010430582B2

(12) United States Patent
Mori et al.

(10) Patent No.: US 10,430,582 B2
(45) Date of Patent: Oct. 1, 2019

(54) MANAGEMENT APPARATUS AND MANAGEMENT METHOD

(71) Applicant: FUJITSU LIMITED, Kawasaki-shi, Kanagawa (JP)

(72) Inventors: Toshitsugu Mori, Akashi (JP); Toru Kitayama, Kobe (JP); Ryota Kawagata, Kobe (JP); Akinobu Takaishi, Kobe (JP); Kiyoshi Kouge, Kuwana (JP); Naoto Ebine, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 15/211,225

(22) Filed: Jul. 15, 2016

(65) Prior Publication Data
US 2017/0053117 A1 Feb. 23, 2017

(30) Foreign Application Priority Data

Aug. 17, 2015 (JP) ................................. 2015-160397

(51) Int. Cl.
*G06F 21/55* (2013.01)
(52) U.S. Cl.
CPC ...... *G06F 21/554* (2013.01); *G06F 2221/031* (2013.01)
(58) Field of Classification Search
CPC ................. G06F 21/554; G06F 9/4887; G06F 2209/486; G06F 2221/031
USPC ......................................................... 726/23
See application file for complete search history.

(56) References Cited

U.S. PATENT DOCUMENTS

| 7,315,893 | B2 | 1/2008 | Vinberg | |
| 2004/0260973 | A1* | 12/2004 | Michelman | ......... G06F 11/1458 714/13 |
| 2007/0067842 | A1* | 3/2007 | Greene | ................. G06F 21/566 726/24 |
| 2014/0006432 | A1 | 1/2014 | Miyagi et al. | |
| 2015/0006895 | A1* | 1/2015 | Irvine | ................. G06F 21/6254 713/171 |

(Continued)

FOREIGN PATENT DOCUMENTS

| JP | 2002-82926 | 3/2002 |
| JP | 2004-535624 | 11/2004 |
| JP | 2014-10667 | 1/2014 |

*Primary Examiner* — Ashokkumar B Patel
*Assistant Examiner* — William B Jones
(74) *Attorney, Agent, or Firm* — Fujitsu Patent Center

(57) ABSTRACT

An information processing apparatus sends a management apparatus execution information about processes that the information processing apparatus has executed while performing a task in response to an instruction from the management apparatus. The management apparatus stores the received execution information in a storage unit. A security detection program monitors the information processing apparatus, and when detecting an alert, sends alert information including information about a process or command being executed by the information processing apparatus, to the management apparatus. The management apparatus receives the alert information, and performs filtering of determining, on the basis of a schedule and the execution information, whether the alert information relates to a task that the management apparatus has instructed the information processing apparatus to perform.

6 Claims, 16 Drawing Sheets

(56) References Cited

U.S. PATENT DOCUMENTS

2016/0164916 A1\* 6/2016 Satish ................ G06F 16/285
726/1

\* cited by examiner

520a OPERATION MANAGEMENT RECORD INFORMATION

| NO. | ITEM | VALUE |
|---|---|---|
| 1 | OPERATION COMPONENT ID | Parts0001 |
| 2 | MANAGEMENT FLOW NAME | Flow001 |
| 3 | OPERATION COMPONENT NAME | File transfer |
| 4 | TASK START DATE AND TIME | 2015/02/26 13:01:00 000 |
| 5 | TASK END DATE AND TIME | 2015/02/26 13:04:00 000 |
| 6 | TASK START MESSAGE | Transfer of specified file starts |
| 7 | TASK END MESSAGE | Transfer of specified file is complete |
| 8 | TASK RESULT | Transfer of specified file is successful |
| 9 | TASK PROGRESS MESSAGE | ・Connect to business server<br>・Establish connection with business server |
| 10 | TASK RESULT CODE | 255 |
| 11 | PROCESS INFORMATION | ... |
| 12 | EXECUTION COMMAND | sftp |
| 13 | EXECUTION START DATE AND TIME | 2015/02/26 13:01 |
| 14 | EXECUTION END DATE AND TIME | 2015/02/26 13:02 |
| 15 | EXECUTION COMMAND | ... |
| ⋮ | | |

FIG. 6

530a PROCESS INFORMATION

| NO. | ITEM | VALUE |
|---|---|---|
| 1 | MANAGEMENT FLOW NAME | Flow001 |
| 2 | OPERATION COMPONENT NAME | File transfer |
| 3 | TASK START DATE AND TIME | 2015/02/26  13:01 |
| 4 | TASK END DATE AND TIME | 2015/02/26  13:04 |
| 5 | PROCESS TREE | \|-snmpd,3447 -Lsd -p /var/run/snmpd.pid -a<br>\`  \`-{snmpd},3459<br>\|-^[[1msshd,3460^[[0m<br>   \|-sshd,6916<br>      \`-bash,6937<br>         \`-ping,7056 -c 100 localhost |
| 6 | EXECUTION COMMAND | sftp |
| 7 | EXECUTION COMMAND HASH VALUE | DAA94DAF6664F1666575CEFDE5F79E8 |
| 8 | COMMAND PARAMETER | root@192.0.0.1<br>/tmp/sample.scv<br>/tmp/work/ |
| 9 | COMMUNICATION DESTINATION INFORMATION | 192.0.0.1 |
| 10 | EXECUTION COMMAND | ... |
| ⋮ | | |

FIG. 7

540a SCHEDULE INFORMATION

| NO. | ITEM | VALUE |
|---|---|---|
| 1 | ID | 00000001 |
| 2 | ACTIVATION TARGET MANAGEMENT FLOW | Flow001 |
| 3 | SCHEDULED ACTIVATION TIME | 2015/03/11 13:00 |
| 4 | SCHEDULED END TIME | 2015/03/11 13:15 |
| 5 | EXECUTION BUSINESS SERVER | Server-0001 |
| 6 | EXECUTION PARAMETER | File:sample.scv |

FIG. 8

550a SCHEDULED TASK LIST

| NO. | ITEM | VALUE |
|---|---|---|
| 1 | COMMAND NAME/OS PROCESS NAME | sftp |
| 2 | MANAGEMENT FLOW NAME | Flow001 |
| 3 | OPERATION COMPONENT ID | Parts0001 |
| 4 | PARENT PROCESS NAME | ini-sshd |
| 5 | EXECUTION COMMAND PATH | /opt/FJSVswjdk |
| 6 | COMMUNICATION DESTINATION INFORMATION | 192.0.0.1 |
| 7 | EXECUTION COMMAND HASH VALUE | DAA94DAF6664F1666575C EFDE5F79E8 |
| 8 | COMMAND PARAMETER | root@192.0.0.1 /tmp/sample.scv /tmp/work/ |
| 9 | OPERATION COMPONENT NAME | File transfer |
| 10 | SCHEDULED EXECUTION START TIME | 2015/03/11 13:00 |
| 11 | SCHEDULED EXECUTION END TIME | 2015/03/11 13:03 |
| 12 | START DELAY TIME | 91.010[sec] |
| 13 | AVERAGE EXECUTION TIME | 195.000[sec] |
| 14 | SHORTEST EXECUTION TIME | 152.000[sec] |
| 15 | LONGEST EXECUTION TIME | 206.000[sec] |

FIG. 9

MANAGEMENT APPARATUS AND MANAGEMENT METHOD

CROSS-REFERENCE TO RELATED APPLICATION

This application is based upon and claims the benefit of priority of the prior Japanese Patent Application No. 2015-160397, filed on Aug. 17, 2015, the entire contents of which are incorporated herein by reference.

FIELD

The embodiments discussed herein relate to a management apparatus and a management method.

BACKGROUND

To address the increasing threats to computer security, there has been an approach to automation, from detection of security incidents to execution of countermeasures. For example, there has been a technique using a combination of a security detection product for detecting security incidents and an operation management flow for automatically performing an operation management process. In such an automation technique, alert information that is detected by the security detection product is identified in advance, and countermeasures that need to be taken when notifications of the identified alerts are made are defined as automation flows. By doing so, when the security detection product detects a security incident and issues an alert, appropriate countermeasures are automatically taken. This technique makes it possible to resolve security incidents promptly.

By the way, the security detection product makes notifications of all suspected information. Therefore, alert information may include alerts based on false detections, which do not need any countermeasures. To deal with this, there is a technique of providing a filter that has filtering criteria for the serious levels of issued alerts, the relative importance levels of objects causing the alerts, and others, so as to exclude alerts based on false detections from alert information.

Please see, for example, Japanese Laid-open Patent Publication No. 2014-10667 and Japanese National Publication of International Patent Application No. 2004-535624.

SUMMARY

According to one aspect, there is provided a non-transitory computer-readable storage medium storing a computer program that causes a computer to perform a process including: obtaining execution information about a first process generated or a first command executed by an information processing apparatus that performs a task in response to an execution instruction for executing the task; upon receiving alert information including information about a second process being generated or a second command being executed by the information processing apparatus when a predetermined event has occurred in the information processing apparatus, determining based on the execution information and the alert information whether or not the second process or the second command has been generated or executed in response to the execution instruction; and filtering the alert information based on a result of the determining and a schedule of execution instructions for executing tasks, the execution instructions being to be made to the information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of operation management record information;

FIG. 7 illustrates an example of process information;

FIG. 8 illustrates an example of schedule information;

FIG. 9 illustrates an example of a scheduled task list;

DESCRIPTION OF EMBODIMENTS

Figure 1:
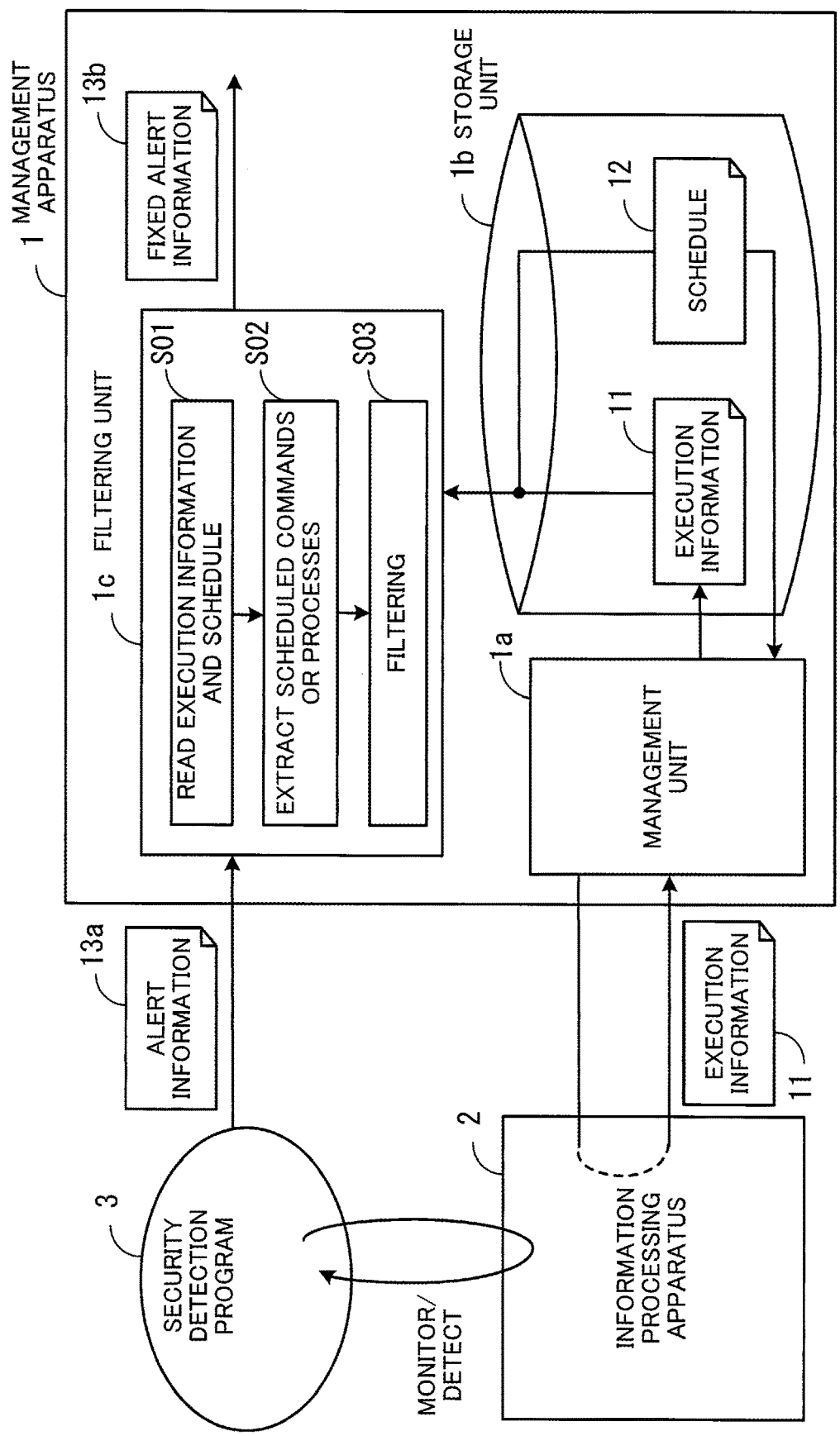
FIG. 1 illustrates an example of a management apparatus according to a first embodiment.

Several embodiments will be described below with reference to the accompanying drawings, wherein like reference numerals refer to like elements throughout.

In a conventional automation technique, criteria for determining whether alert information is due to a false detection are defined by administrators in advance, considering the content of alerts that may occur in a computer to be managed. However, it is not easy to investigate processes that are performed on the computer to be managed in advance, consider alerts that may occur, and define the criteria. In addition, if processes that are performed on the computer to be managed are changed, the criteria need to be changed accordingly. That is to say, complicated work needs to be done to define the criteria, and the criteria need to be updated occasionally to maintain the accuracy. Therefore, it is not easy to improve the accuracy of the criteria.

First Embodiment

FIG. 1 illustrates an example of a management apparatus according to a first embodiment. A management apparatus 1 includes a management unit 1a, a storage unit 1b, and a filtering unit 1c, and is designed to manage the operations of an information processing apparatus 2. The information processing apparatus 2 runs prescribed applications. The management apparatus 1 and information processing apparatus 2 are computers, for example. A security detection program 3 monitors the information processing apparatus 2 to detect the occurrence of security incidents, such as unauthorized access, file transfer to unauthorized communication destinations, and activation of malicious applications. When detecting a security incident, the security detection program 3 sends alert information 13a indicating the event of the incident to the management apparatus 1. For example, the alert information 13a includes information on a process being generated or a command being executed by the information processing apparatus 2 when a predetermined event has occurred in the information processing apparatus 2. The security detection program 3 may be implemented on the management apparatus 1, the information processing apparatus 2, or another apparatus. Each unit of the management apparatus 1 will now be described.

In the management unit 1a, a procedure for an operation management process to be performed is defined in advance. For example, the operation management process includes confirming the status of a process running on the information processing apparatus 2, and confirming and backing up the content of a file stored in the information processing apparatus 2. The management unit 1a initiates the defined operation management process according to a schedule 12, and outputs an execution instruction for a task to the information processing apparatus 2. Then, the management unit 1a obtains, from the information processing apparatus 2, execution information 11, such as processes, commands, or the like executed by the information processing apparatus 2 during the course of the task. The information processing apparatus 2 obtains the execution information 11 while performing the task. The management unit 1a stores the obtained execution information 11 in the storage unit 1b. The storage unit 1b holds the execution information 11 and the schedule 12.

The filtering unit 1c receives the alert information 13a from the security detection program 3, and performs filtering based on the execution information 11 and schedule 12. For example, when receiving the alert information 13a, the filtering unit 1c determines on the basis of the execution information 11 and alert information 13 whether a process or command indicated by the alert information 13a has been generated or executed in response to an execution instruction for a task. Then, the filtering unit 1c filters the alert information 13a according to the determination result and the schedule 12 of execution instructions for tasks to be made to the information processing apparatus 2. The security detection program 3 makes notifications of all events detected as suspicious, as alert information 13a. In this connection, for example, file transfer that is performed in response to an instruction from an external device or malware is a security incident. However, file transfer that is performed in response to an instruction from the management apparatus 1 is not a security incident. However, the security detection program 3 is not able to determine whether a process has been performed in response to an instruction from the management apparatus 1, and therefore the security detection program 3 makes a notification as alert information 13a, irrespective of a security incident or not. The filtering unit 1c determines whether the alert information 13a relates to a task performed in response to an instruction from the management apparatus 1, to thereby perform the filtering. If the filtering unit 1c determines that the alert information 13a relates to a task performed in response to an instruction from the management apparatus 1, the filtering unit 1c determines that the alert information 13a is due to a false detection, and then discards the alert information 13a. If the filtering unit 1c determines that the alert information 13a does not relate to a task performed in response to an instruction from the management apparatus 1, then the filtering unit 1c determines that the alert information 13a is not due to a false detection, and then outputs fixed alert information 13b.

More specifically, the filtering unit 1c reads the execution information 11 and schedule 12 from the storage unit 1b (S01), and extracts scheduled commands or processes on the basis of the execution information and schedule 12 (S02). The extracted scheduled commands or processes are to be used as filtering criteria in filtering. The procedure up to here may be performed in advance. The filtering unit 1c then performs filtering of comparing a command or process detected in the information processing apparatus 2 as a security incident indicated in the alert information 13a, against the filtering criteria, and outputting the fixed alert information 13b upon determining that the security incident is not due to a false detection (S03).

As described above, the management apparatus 1 defines the filtering criteria based on the execution information 11 about a task performed in the information processing apparatus 2 and the schedule 12. Then, when receiving alert information 13a regarding the information processing apparatus 2, the management apparatus 1 determines whether the alert information 13a is due to a false detection, and outputs fixed alert information 13b if it is not due to a false detection. Since it is determined whether the alert information 13a is due to a false detection, on the basis of processes or commands actually generated in the target information processing apparatus 2, it is possible to improve the accuracy of determining whether the alert information 13a is due to a false detection.

Second Embodiment

A second embodiment will now be described. The second embodiment provides a management server for managing business servers that perform a variety of business operations.

Figure 2:
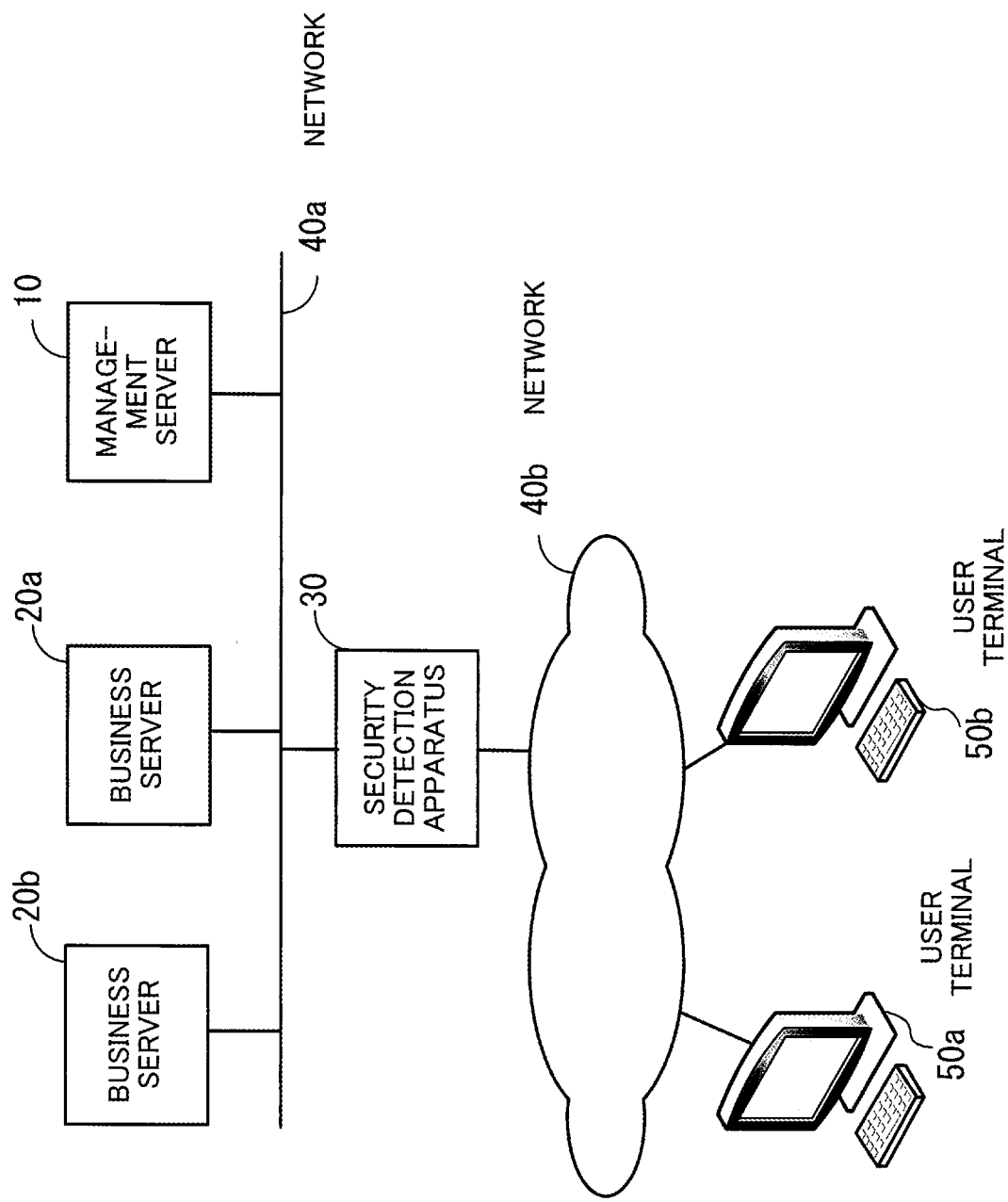
FIG. 2 illustrates an example of a system configuration according to a second embodiment.

FIG. 2 illustrates an example of a system configuration according to the second embodiment. A management server 10, business servers 20a and 20b, and a security detection apparatus 30 for monitoring the security status of the business servers 20a and 20b are connected to a network 40a. In addition, the security detection apparatus 30 is connected to user terminals 50a and 50b over a network 40b.

The management server 10 is connected to the business servers 20a and 20b and the security detection apparatus 30 over the network 40a. The management server manages the operations of the business servers 20a and 20b, and instructs the business servers 20a and 20b to perform an operation management process in accordance with a predetermined procedure. The management server 10 is one example of the management apparatus 1.

The business servers 20a and 20b perform prescribed business operations. For example, the business servers 20a and 20b perform the business operations while communicating with the user terminals 50a and 50b. The business servers 20a and 20b are one example of the information processing apparatus 2.

The security detection apparatus 30 monitors the business servers 20a and 20b, and when detecting a security incident in the business servers 20a and 20b, sends alert information to the management server 10. The security detection apparatus 30 is a computer in which a security detection program 3 is implemented, for example. The security detection apparatus 30 monitors communication between the business servers 20a and 20b and external devices, such as the user terminals 50a and 50b or other business servers. Then, the security detection apparatus 30 takes suspected communication for fraudulent use, such as unauthorized access to the business servers 20a and 20b and unauthorized data transfer from the business servers 20a and 20b, as security incidents, and then sends alert information to the management server 10.

The user terminals 50a and 50b perform prescribed processes in collaboration with the business servers 20a and 20b, such as obtaining user-desired information from the business servers 20a and 20b and displaying the information.

In this connection, FIG. 2 illustrates a configuration where the networks 40a and 40b are connected via the security detection apparatus 30. Alternatively, all of the above apparatuses and devices may be connected to the same network. In addition, the security detection apparatus 30 may not be provided as an independent apparatus, and for example, the management server 10 or business server 20a, 20b may be designed to perform a security detection process.

Figure 3:
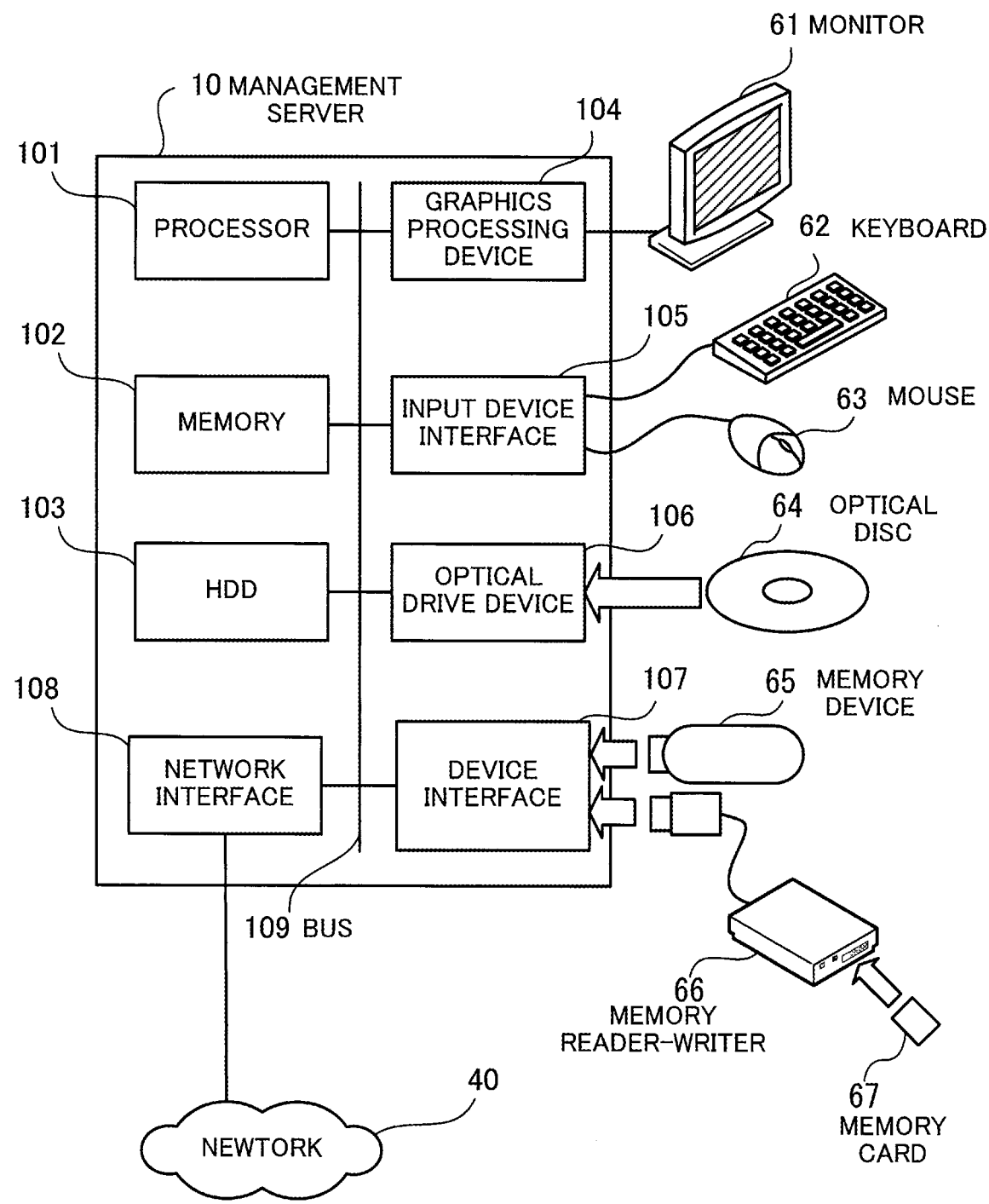
FIG. 3 illustrates an example of a hardware configuration of a management server according to the second embodiment.

FIG. 3 illustrates an example of a hardware configuration of a management server according to the second embodiment. The management server 10 is entirely controlled by a processor 101. A memory 102 and a plurality of peripheral devices are connected to the processor 101. The processor 101 may be a multiprocessor. The processor 101 is, for example, a Central Processing Unit (CPU), a Micro Processing Unit (MPU), or a Digital Signal Processor (DSP). At least part of functions implemented by the processor 101 executing a program may be implemented by using an Application Specific Integrated Circuit (ASIC), a Programmable Logic Device (PLD), or other electronic circuits.

The memory 102 is used as a main storage device of the management server 10. The memory 102 temporarily stores therein at least part of Operating System (OS) programs and application programs to be executed by the processor 101. The memory 102 also stores therein a variety of data that is used by the processor 101 in processing. As the memory 102, a volatile semiconductor storage device, such as a Random Access Memory (RAM), may be used, for example.

The peripheral devices connected to a bus 109 include a Hard Disk Drive (HDD) 103, a graphics processing device 104, an input device interface 105, an optical drive device 106, a device interface 107, and a network interface 108.

The HDD 103 magnetically reads and writes data on a built-in disk. The HDD 103 is used as an auxiliary storage device of the management server 10. The HDD 103 stores OS programs, application programs, and a variety of data. In this connection, as the auxiliary storage device, a flash memory or another non-volatile semiconductor device (Solid State Drive "SSD") may be used.

A monitor 61 is connected to the graphics processing device 104. The graphics processing device 104 displays images on the display of the monitor 61 in accordance with instructions from the processor 101. As the monitor 61, a display device using a Cathode Ray Tube (CRT) display or liquid crystal display device may be used.

A keyboard 62 and a mouse 63 are connected to the input device interface 105. The input device interface 105 outputs signals received from the keyboard 62 and mouse 63 to the processor 101. In this connection, the mouse 63 is one example of pointing devices, and another pointing device may be used. Other pointing devices include touch panels, tablets, touch pads, and trackballs.

The optical drive device 106 reads data from an optical disc 64 with laser light or the like. The optical disc 64 is a portable recording medium on which data is recorded such as to be readable with reflection of light. The optical disc 64 may be a Digital Versatile Disc (DVD), DVD-RAM, CD-ROM (Compact Disc Read Only Memory), CD-R (Recordable), CD-RW (ReWritable), or another.

The device interface 107 is a communication interface that allows peripheral devices to be connected to the management server 10. For example, a memory device 65 or memory reader-writer 66 may be connected to the device interface 107. The memory device 65 is a recording medium having a function of communicating with the device interface 107. The memory reader-writer 66 reads or writes data on a memory card 67, which is a card-type recording medium.

The network interface 108 is connected to the network 40. The network interface 108 communicates data with another computer or communication device over a network 40.

With the above hardware configuration, the processing functions of the second embodiment are implemented. In this connection, the business servers 20a and 20b, security detection apparatus 30, and user terminals 50a and 50b may be implemented with the same hardware configuration as the management server 10 of FIG. 3. In addition, the management apparatus 1 of the first embodiment may be implemented with the same hardware configuration as the management server 10 of FIG. 3.

The management server 10 implements the processing functions of the second embodiment by executing a program recorded on a computer-readable recording medium, for example. The program describing the processing content to be executed by the management server 10 may be recorded on a variety of recording media. For example, the program to be executed by the management server 10 may be stored on the HDD 103. The processor 101 loads at least part of the program from the HDD 103 to the memory 102 and then executes the program. Alternatively, the program to be executed by the management server 10 may be recorded on the optical disc 64, memory device 65, memory card 67, or another portable recording medium. The program stored in such a portable recording medium becomes executable after being installed on the HDD 103 under the control of the processor 101, for example. Alternatively, the processor 101 may execute the program directly read from a portable recording medium.

Figure 4:
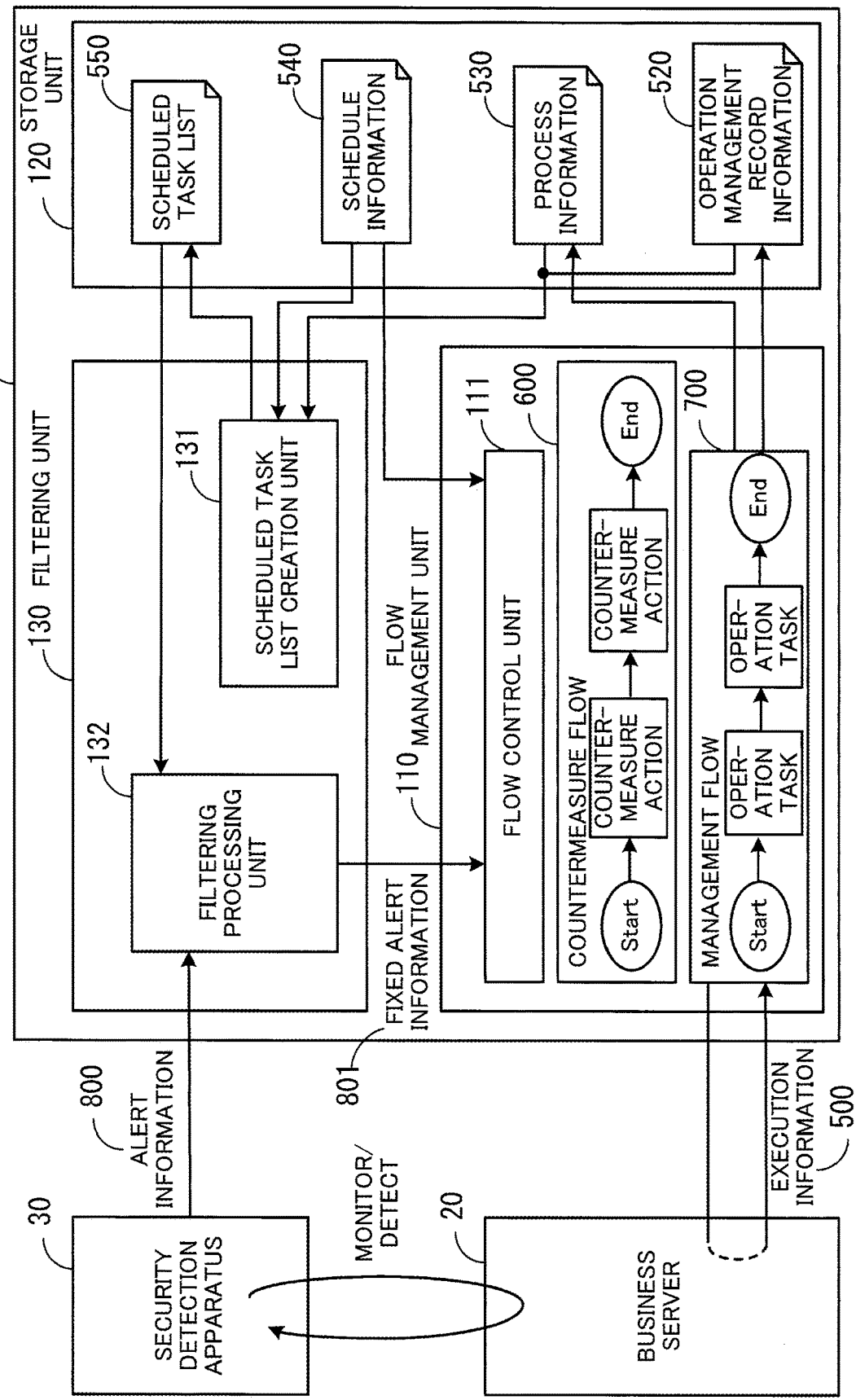
FIG. 4 is a functional block diagram of the management server.

FIG. 4 is a functional block diagram of a management server. The management server 10 includes a flow management unit 110, a storage unit 120, and a filtering unit 130. The management server 10 manages a plurality of business servers 20a and 20b. Since the management server 10 performs an operation management process on a server basis, the following describes a business server 20 as a representative.

The flow management unit 110 has a flow control unit 111, and a countermeasure flow 600 and a management flow 700 previously defined by an administrator. The countermeasure flow 600 and management flow 700 each define a procedure that the flow management unit 110 instructs the business server 20 to perform, and are stored in storage space of the flow management unit 110. Alternatively, the countermeasure flow 600 and management flow 700 may be stored in the storage unit 120. The countermeasure flow 600 defines countermeasure actions that the flow management unit 110 instructs the business server 20 to take when receiving fixed alert information 801. The countermeasure flow 600 is described as a combination of countermeasure components each defining an action. For example, the countermeasure flow 600 defines actions, such as disconnecting from a network and terminating an application. The management flow 700 defines operation tasks to be performed by the business server 20 for an operation management process. The management flow 700 is described as a combination of operation components. For example, the management flow 700 defines tasks, such as file transfer, confirmation of the status of a process, mail transmission, and directory/file search in the business server 20.

The flow control unit 111 initiates the management flow 700 according to schedule information 540. In addition, the flow control unit 111 accumulates records of tasks that the flow control unit 111 has instructed the business server 20 to perform in the execution of the management flow 700, as operation management record information 520 in the storage unit 120. In addition, the flow control unit 111 obtains execution information 500 about processes and/or commands executed by the business server 20 during the course of the tasks corresponding to the obtained records, from the business server 20. Then, the flow control unit 111 stores the obtained execution information 500 as process information 530 in association with the corresponding records included in the operation management record information 520 in the storage unit 120. In this connection, in the execution information 500, information that is treated as record information is added to the operation management record information 520, for example. In addition, when receiving the fixed alert information 801 determined not to be due to a false detection by the filtering unit 130, the flow control unit 111 initiates the countermeasure flow 600 corresponding to the fixed alert information 801. The flow management unit 110 is one example of the management unit 1a of the first embodiment.

The storage unit 120 stores the operation management record information 520, the process information 530, the schedule information 540, and a scheduled task list 550. As the storage unit 120, for example, part of the storage space of the memory 102 or HDD 103 is used.

The filtering unit 130 includes a scheduled task list creation unit 131 and a filtering processing unit 132. The scheduled task list creation unit 131 creates the scheduled task list 550 on the basis of the operation management record information 520 and process information 530 obtained by the flow management unit 110 in the operation management process, the schedule information 540, and the management flow 700. The scheduled task list creation unit 131 specifies the management flow 700 scheduled to be executed during a predetermined time period, with reference to the schedule information 540. The scheduled task list creation unit 131 then creates a list of scheduled commands or processes, which are to be executed, on the basis of the operation management record information 520 accumulated about the management flow 700 and the process information 530 associated with the operation management record information 520. The scheduled task list 550 includes information extracted from the operation management record information 520 or process information 530, and information generated based on the extracted information, with respect to the scheduled commands or processes. The filtering processing unit 132 performs a filtering process on alert information 800 received from the security detection apparatus 30, on the basis of the scheduled task list 550. The filtering unit 130 is one example of the filtering unit 1c of the first embodiment.

The business server 20 performs prescribed business operations, and also operates in accordance with instructions received from the flow control unit 111 of the management server 10.

As described above, in the management server 10, the flow management unit 110 initiates the management flow 700 according to the schedule information 540. In the second embodiment, tasks that are defined in the management flow 700 and are to be performed by the business server 20 are involved in an operation management process for the business server 20, and are performed regularly. For example, the management flow 700 is initiated at a predetermined time on predetermined days. Therefore, when the same management flow 700 is executed next time, commands or processes that are executed by the business server 20, the time to be taken for each task, and others may be predicted on the basis of the record information about previous executions of the tasks. The flow management unit 110 obtains the execution information 500 each time it causes the business server 20 to perform a task, and accumulates the obtained execution information 500 as the operation management record information 520 and process information 530. The filtering unit 130 creates the scheduled task list 550 on the basis of the accumulated operation management record information 520 and process information 530, and the schedule information 540.

The security detection apparatus 30 detects a security incident occurring in the business server 20, and sends the alert information 800 to the management server 10. The filtering unit 130 determines whether the security incident indicated by the alert information 800 relates to a task performed for the flow management unit 110, on the basis of the scheduled task list 550. If the alert information 800 relates to a task performed for the flow management unit 110, the filtering unit 130 determines that the alert information 800 is due to a false detection. If the alert information 800 does not relate to a task performed for the flow management unit 110, the filtering unit 130 determines that the alert information 800 is not due to a false detection, and outputs the fixed alert information 801 to the flow management unit 110. The flow management unit 110 receives the fixed alert information 801, and then initiates the corresponding countermeasure flow 600.

As described above, it is determined whether the alert information 800 is due to a false detection, on the basis of information obtained when the operation management process has previously been performed. This improves the accuracy of determining whether the alert information 800 is due to a false detection. Further, it is possible to prevent unneeded countermeasures due to alert information 800 based on a false detection from being taken.

The following describes a specific example of how the management server 10 operates. First, a process for creating the scheduled task list 550 will be described. Then, a filtering process using the scheduled task list 550 will be described.

(1) Scheduled Task List Creation Process

Figure 5:
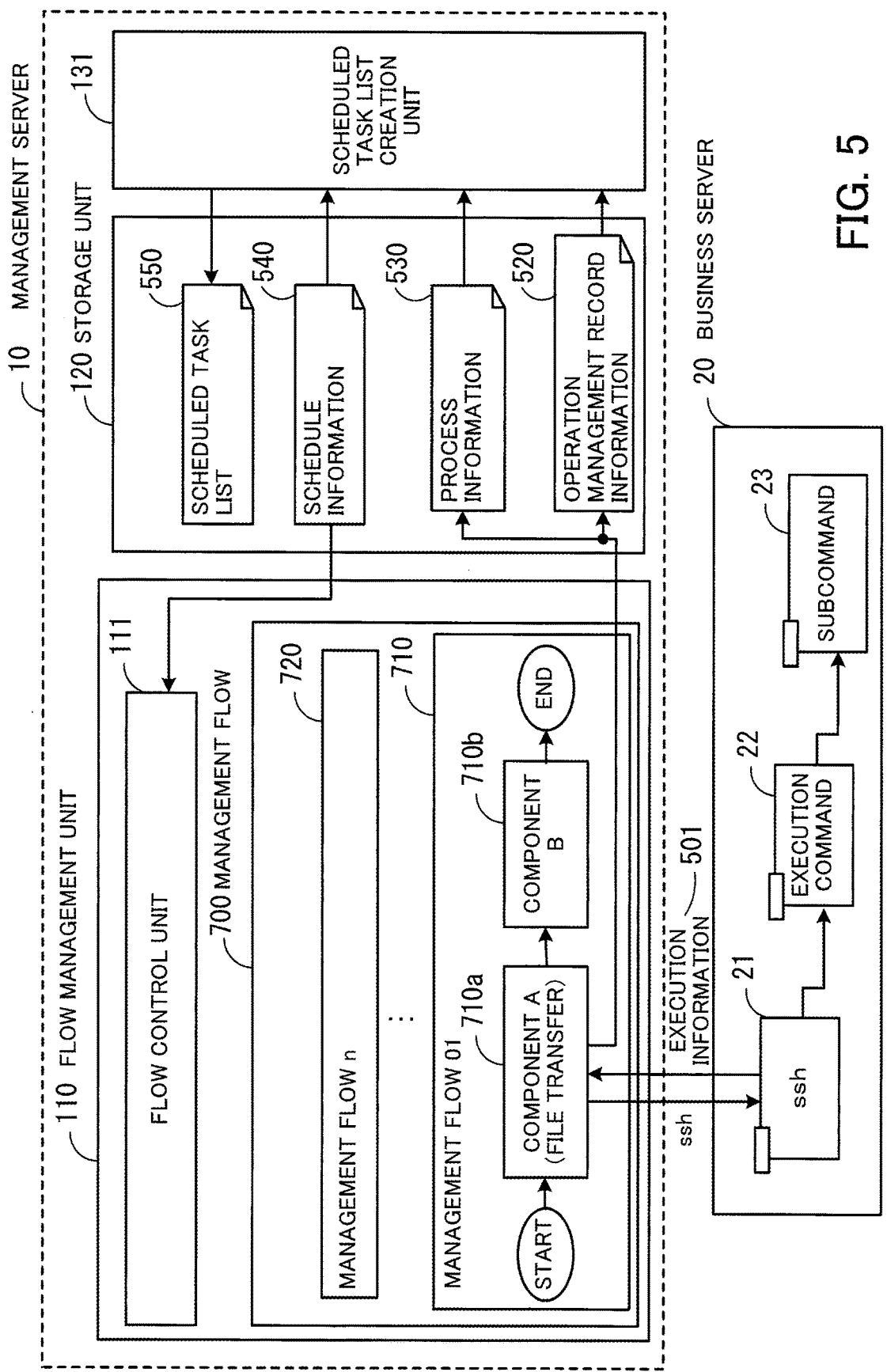
FIG. 5 illustrates a flow of information in a scheduled task list creation process.

FIG. 5 illustrates a flow of information in a scheduled task list creation process. FIG. 5 only illustrates a partial configuration related to the scheduled task list creation process, out of the configuration of the management server 10 of FIG. 4.

A management flow 700 includes a plurality of management flows 01 (710), ..., and n (720) defining an operation management process. Referring to the example of FIG. 5, the management flow 01 (710) defines a component A (710a) for instructing the business server 20 to perform file transfer, and a component B (710b). The flow control unit 111 starts to operate in accordance with the management flow 01 (710) at the activation time of the management flow 01 (710) according to schedule information 540. In accordance with the management flow 01 (710), the flow control unit 111 causes the business server 20 to perform the operation management process formed by the component A (710a) and the component B (710b). For example, to have the process performed, the flow control unit 111 makes a remote login and operates the business server 20 to perform operation management tasks, such as file transfer or confirmation of the status of a process. Alternatively, an agent deployed in the business server 20 may be instructed for the tasks. Referring to the example of FIG. 5, "file transfer" is defined in the component A (710a), and a command on the business server 20 is executed using Secure Shell (ssh). At this time, the flow control unit 111 records a connection session ID of ssh and a record ID of the operation component. In the example of FIG. 5, the record ID identifies the record information of the component A (710a).

In the business server 20, an execution command 22 for the file transfer is activated via ssh 21. The execution command 22 is to activate a subcommand 23 for an OS process, thereby performing the file transfer. To this end, the management server 10 outputs an instruction for the file transfer. In this connection, the business server 20 determines what commands to use for OS processes. That is to say, commands and processes that are determined and executed by the business server are unable to be obtained from information held in the management server 10. Therefore, when performing a task based on the management flow 700, the business server 20 obtains process tree information. Then, the business server 20 specifies a connection session ID on the basis of an OS process and the process tree information, and stores the connection session ID and the process tree information in association with each other. In addition to obtaining the process tree information, the business server 20 obtains execution commands actually executed, parameters given to commands, hash values (hereinafter, referred to as execution command hash values) of modules activated by the commands, and others. Further, each time a command or process is executed, the business server 20 obtains its execution start time and end time. Such information may be used to identify a command or process. When communication is performed, information about a communication destination, such as a communication address, is obtained from a firewall log or the like. The business server 20 stores thus obtained process tree information, execution command, command parameter, execution command hash value, communication destination information, and execution start and end times in association with a corresponding connection session ID as execution information 501.

When the task corresponding to the component A (710a) is completed in the business server 20, the flow management unit 110 obtains execution information 501 from the business server 20. The flow control unit 111 may be designed to obtain the execution information 501, or the transmission of the execution information 501 may be defined in the component A (710a) in advance. The flow management unit 110 associates record information and process information corresponding to the task in question of the management flow with each other, using the connection session ID and record ID stored in association with the task, and the connection session ID associated with the execution information 501 obtained from the business server 20, and additionally registers them to operation management record information 520 and process information 530.

In this way, in the storage unit 120, the operation management record information 520 and process information 530 are accumulated each time a task based on the management flow 700 is performed. However, simply accumulating the operation management record information 520 and process information 530 causes a problem, such as lack of resources in the management server 10. To deal with this, the flow management unit 110 analyzes obtained process information, and stores only information satisfying prescribed storage conditions. For example, only process information that is obtained when the management flow 700 is executed for the first time after a change is made to the process definition of the business server 20 may be accumulated. In addition, an obtained execution command hash value is compared with the execution command hash value of the same command previously obtained in the task, and only if they are different values, the currently obtained process information may be accumulated. That is, if the execution command hash values are identical, the current process information is not accumulated. In this way, the flow control unit 111 is able to reduce a risk of lack of resources in the management server 10 by selectively accumulating process information.

The scheduled task list creation unit 131 creates scheduled task list 550 on the basis of the operation management record information 520 and process information 530 accumulated in the storage unit 120, and the schedule information 540. The scheduled task list creation unit 131 starts the creation at a previously designated time, and extracts appropriate information from the operation management record information 520 and process information 530. For example, assuming that a unit time is set to one month, records accumulated in past one month are extracted from the operation management record information 520 accumulated in past one month. If too many records are accumulated in past one month, only a limited number of records may be extracted. From the process information 530, information associated with the extracted operation management record information is extracted. Then, the scheduled task list creation unit 131 creates an execution command list on the basis of the extracted information. The execution command list includes, for each operation component, information regarding commands, such as execution commands to be executed by this component, execution command hash values, and command parameters. Then, the scheduled task list creation unit 131 specifies a management flow 700 scheduled to be performed during a predetermined time period, on the basis of the schedule information 540, and extracts information about operation components corresponding to the specified management flow 700 from the execution command list. In addition, the scheduled task list creation unit 131 extracts corresponding record information from the operation management record information 520, and calculates the average execution time, the longest execution time, the shortest execution time, and others to be taken to complete each command. The start and end times defined in the schedule information 540 are scheduled times, and there is a time gap between these scheduled times and actual times taken for an execution. Therefore, the maximum time gap for an individual command between a scheduled time and an actual time obtained from record information is calculated, in order to set a longer time width in filtering criteria for determining whether an alert detected relates to the command.

The following describes the operation management record information 520, process information 530, schedule information 540, and scheduled task list 550 to be stored in the storage unit 120 by the above procedure.

FIG. 6 illustrates an example of operation management record information. Operation management record information 520a includes task information obtained by the management server 10 and information extracted from execution information 500 obtained by the business server 20, with respect to the execution of the management flow 700. The task information includes the following items: operation component ID, management flow name, operation component name, task start date and time, task end date and time, task start message, task end message, task result, task progress message, task result code, and process information with respect to the management flow 700. The information extracted from the execution information 500 includes the following items: execution command, execution start date and time, and execution end date and time, with respect to each executed command. The operation management record information 520a of FIG. 6 is record information about a single operation component. The flow management unit 110 generates such record information for each operation component defined in the management flow 700. In addition, a record of each operation component is accumulated each time the operation component is executed.

As the operation component ID item, an operation component ID identifying an operation component is set. An operation component ID is individually assigned to each operation component. As the management flow name item, a name given to the management flow 700 initiated by the flow control unit 111 is set. Each management flow is identified by a management flow name. As the operation component name item, a name given to the operation component defined in the management flow 700 is set. The name represents what the task of the operation component is. As the task start date and time item, the date and time when a task defined in the operation component started after the initiation of the management flow 700 is set. As the task end date and time item, the date and time when the task ended is set. As the task start message item, a message to be presented as needed when the task defined in the operation component starts is set. As the task end message, a message to be presented when the task defined in the operation component ends is set. As the task result item, the result of the task is set. As the task progress message item, messages indicating the progress of the task defined in the operation component are set. As the task result code item, a result code indicating the task result is set. It is possible to determine a transition destination to which the management flow 70 transitions next, from the task result code. As the process information item, the ID of process information 530a associated with this operation management record information is set. The above information is the task information about the management flow 700, which the management server 10 is able to obtain.

As the execution command item, a command executed by the business server 20 is set. As the execution start date and time item, the execution start date and time when the execution command started is set. As the execution end date and time item, the execution end date and time when the execution command ended is set. Information is registered in a set of items 12 to 14 for each execution command executed.

FIG. 7 illustrates an example of process information. Process information 530a has the following items: management flow name, operation component name, task start date and time, task end date and time, process tree, execution command, execution command hash value, command parameter, and communication destination information. The process information 530a of FIG. 7 is associated with the operation management record information 520a of FIG. 6.

As the management flow name, operation component name, task start date and time, and task end date and time items, the same values as set in the operation management record information 520a are set.

As the process tree item, a process tree generated by the business server 20 for the task defined by the operation component is set. The business server 20 executes the task in accordance with this process tree. As the execution command item, a command executed in the operation management task, which is determined based on the process tree, is set. As the execution command hash value item, a hash value of a module activated by the execution command is set. The same hash value is obtained for the same activated module. As the command parameter item, a parameter to be supplied at the time of the execution of the command is set. As the communication destination information item, a communication destination address obtained from a firewall log is set. In the case where there are a plurality of commands to be executed, information is set in items 7 to 10, i.e., from the execution command item to the communication destination information item, for each of the commands.

As described above, the process information 530a is execution information 500 that the business server 20 itself obtains during the course of the task performed in response to an instruction from the management server 10.

In this connection, the management server 10 registers the execution start date and time and execution end date and time of a command or process, out of the execution information 500 obtained from the business server 20, in the operation management record information 520a for each command or process. This is because a different execution start date and time and a different execution end date and time are obtained for each execution of a command or process, and therefore an analysis process is needed to create a scheduled task list 550. On the other hand, information set in the process information 530a does not change as long as the management flow 700 is not changed, the configuration of the business server 20 is not changed, or another change is not made. Therefore, such information is managed as the process information 530a, separately from the operation management record information 520a. In addition, if such information, which is not changed if the above change is not made, is accumulated in the storage unit 120 for each execution, there may be lack of resources in the management server 10. To deal with this, the flow control unit 111 checks the execution information 500 and if the execution information 500 do not change from the previous one, does not accumulate the execution information 500 as the process information 530a. If the execution information 500 changes from the previous one or at the first activation, the flow control unit 111 extracts appropriate information from the execution information 500, and associates the extracted information with operation management record information 520a updated on the basis of the execution information 500 at the same time, and accumulates it in the storage unit 120.

FIG. 8 illustrates an example of schedule information. Schedule information 540a has the following items: ID, activation target management flow, scheduled activation time, scheduled end time, execution business server, and execution parameter. The schedule information 540a illustrated in FIG. 8 contains a schedule for initiating the management flow illustrated in FIGS. 6 and 7.

As the ID item, information identifying this schedule is set. As the activation target management flow item, the name of a target management flow to be initiated is set. As the scheduled activation time item, the date and time indicating when the target management flow is scheduled to be initiated are set. As the scheduled end time item, the date and time indicating when the target management flow is scheduled to end are set. As the execution business server item, a business server to be caused to perform the activation target management flow is set. As the execution parameter item, a file containing parameters to be supplied when the activation target management flow is performed is registered.

FIG. 9 illustrates an example of a scheduled task list. Scheduled task list 550a has the following items: command name/OS process name; management flow name; operation component ID; parent process name; execution command path; communication destination information; execution command hash value; command parameter; operation component name; scheduled execution start time; scheduled execution end time; start delay time; average execution time; shortest execution time; and longest execution time. Each value in these items is set by the scheduled task list creation unit 131 on the basis of the schedule information 540a, operation management record information 520a, process information 530a, and management flow 700. The following describes the case of creating a scheduled task list for a command scheduled to be executed on the current day, with reference to FIG. 9. In addition, FIG. 9 illustrates information about a single command. However, the scheduled task list creation unit 131 creates a list by setting information with respect to every scheduled command or OS process for a management flow scheduled to be performed on the current day, in the same way.

As the command name/OS process name item, the name of a scheduled command or OS process is set. As the management flow name item, the name of a scheduled management flow is set. As the operation component ID and operation component name items, the ID and name of an operation component defined in the scheduled management flow are set, respectively. For the management flow name item, the name of the management flow scheduled to be performed on the current day is extracted from the schedule information 540a and set by the scheduled task list creation unit 131. Values in the operation component ID and operation component name items are set in the similar manner. For the command name/OS process name item, record information regarding the extracted operation component is extracted from the operation management record information 520a, and a value in the execution command item is extracted from the extracted record information and is set. For example, an execution command "sftp" corresponding to the operation component name "Parts0001" of the management flow name "Flow001" is extracted from the operation management record information 520a of FIG. 6, and is set in the scheduled task list 550a.

As the communication destination information item, a communication destination for the execution of the scheduled command is set. As the execution command hash value item, the hash value of the scheduled command is set. As the command parameter item, a parameter to be supplied when the scheduled command is activated is set. The scheduled task list creation unit 131 extracts the process information 530a of FIG. 7 associated with the operation management record information 520a, and sets the execution command hash value, command parameter, and communication destination information corresponding to the command name/OS process name registered in the scheduled task list 550a.

In addition, as the parent process name and execution command path items, values are set based on the process tree information registered in the process information 530a.

As the scheduled execution start time item, the scheduled start time of the command is set. As the scheduled execution end time item, the scheduled end time of the command is set. As the start delay time item, a difference between the scheduled start time of the command and the time when the command actually started is set, and this difference indicates a possible delay time in the start of the command. As the average execution time item, the average execution time based on previous executions from the start to the end of the command is set. As the shortest execution time item, the shortest execution time based on the previous executions of the command is set. As the longest execution time item, the longest execution time based on the previous executions of the command is set. These kinds of information is set based on the information about the command registered in the extracted operation management record information 520a. These kinds of information is calculated based on the scheduled activation time registered in the schedule information 540a and the execution start date and time and execution end date and time registered in the operation management record information 520a. In this connection, in the second embodiment, it is assumed that the management flow 700 is initiated at a fixed activation time every day. The operation management record information 520a contains records for a plurality of executions with respect to an execution command. First, the execution start dates and times and the execution end dates and times for the plurality of executions are analyzed to calculate the start delay time, average execution time, shortest execution time, and longest execution time. The scheduled execution start time is calculated based on the management flow 700 and the process tree registered in the process information 530a, using the scheduled activation time of the flow registered in the schedule information 540a as the first start time in the management flow 700. For example, the scheduled execution start time is calculated using the order of execution of commands obtained from the process tree and the average execution times of the commands. The scheduled execution end time is calculated by adding the average execution time to the scheduled execution start time. The start delay time is calculated based on a difference between the calculated scheduled execution start time and the execution start date and time registered in the operation management record information 520a.

The above-described items of the scheduled task list 550a and the above-described method for calculating values for the above items are just an example, and some of them may be omitted. In addition, other items may be added if they specify a command or process.

The following describes how the management server 10 operates, with reference to flowcharts.

Figure 10:
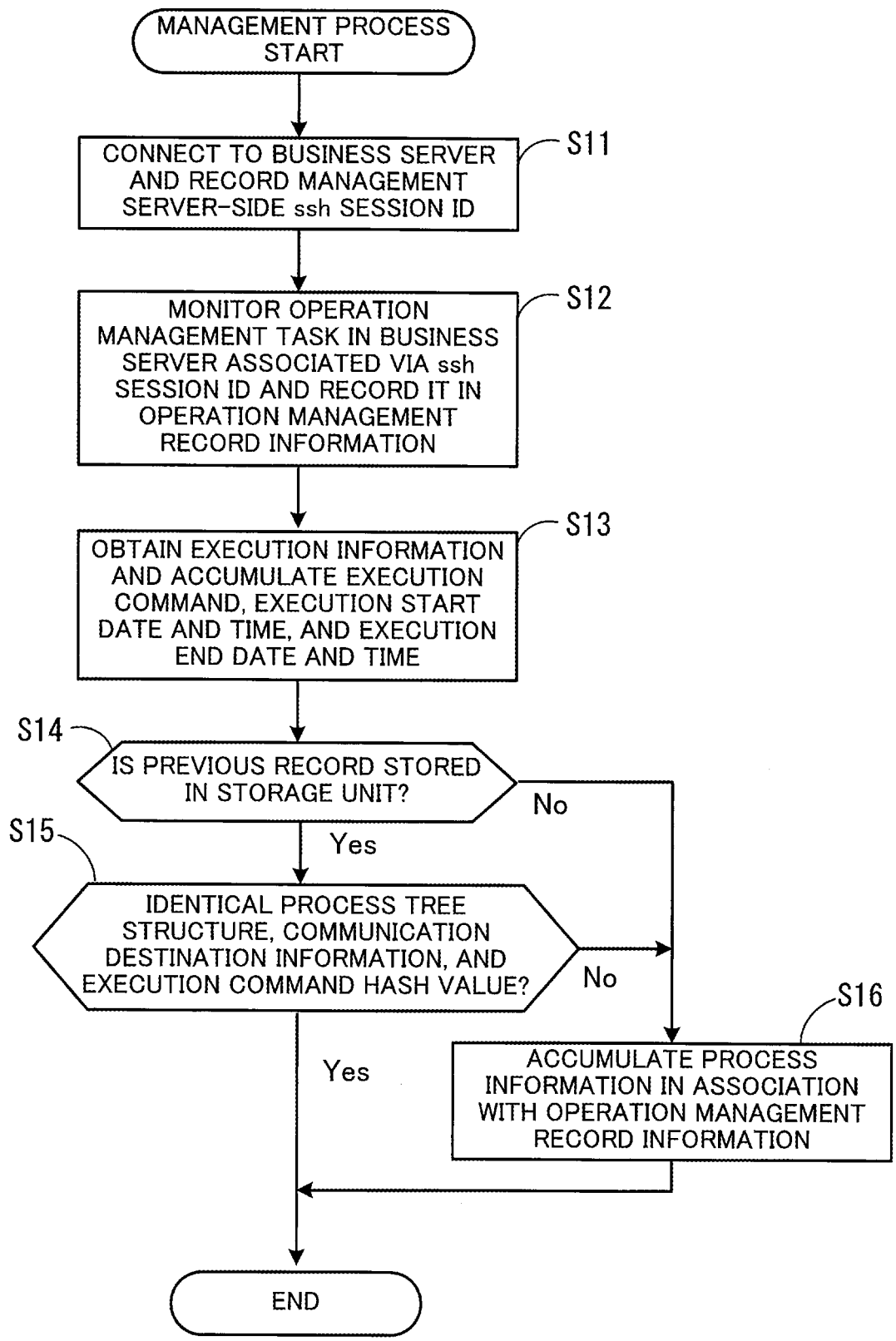
FIG. 10 illustrates a procedure for a management process.

FIG. 10 illustrates a procedure for a management process. The management process is involved in an operation management process that is performed by the flow management unit 110 initiating the management flow 700. The flow control unit 111 reads the schedule information 540 from the storage unit 120, checks the "scheduled activation time", and initiates the management flow 700 when its scheduled activation time has come. The following procedure is performed for each operation component defined in the management flow 700.

(Step S11) The flow control unit 111 connects to the business server registered in the "execution business server" item of the read schedule information 540, and establishes an ssh session. The session ID assigned at this time is recorded as a management server-side ssh session ID.

(Step S12) The flow control unit 111 monitors an operation management task that is executed by outputting an instruction to the business server associated with the initiated operation component via the ssh session ID. In addition, the flow control unit 111 stores a record of the operation management task in the operation management record information 520. The business server 20 obtains execution information 500, such as the structure of an OS process tree to be executed in response to the instruction from the management server 10, and command parameters, and records the execution information 500 in association with the execution command. The acquisition of the execution information 500 may be defined in the management flow 700.

(Step S13) When the operation component is completed, the flow control unit 111 obtains the execution information 500 obtained by the associated business server 20. The execution information 500 includes an execution start date and time, an execution end date and time, an OS process tree, an execution command hash value, a command parameter, communication destination information, and others for each command or process executed in the business server 20. In the following, the OS process tree, execution command hash values, command parameters, and communication destination information are treated as process information 530. The flow control unit 111 registers the execution command, and the execution start date and time and execution end date and time of each execution command, in the associated operation management record information 520.

(Step S14) The flow control unit 111 searches the operation management record information 520 in the storage unit 120 to find record information previously obtained for the same management flow 700. If the flow control unit 11 finds such previously obtained record information, the procedure proceeds to step S15; otherwise, the procedure proceeds to step S16.

(Step S15) The flow control unit 111 extracts process information associated with the detected record information from the process information 530 stored in the storage unit 120, and compares the extracted process information 530 with the process information obtained this time. The flow control unit 111 compares the extracted process information 530 with the current process information to see if they are identical in terms of process tree structure, communication destination information, execution command hash value, and others. If the flow control unit 111 determines that they are identical in terms of all of the process tree structure, communication destination information, and execution command hash value, the procedure is completed; otherwise, the procedure proceeds to step S16.

(Step S16) Since the same process information 530 as the process information obtained this time is not stored, the flow control unit 111 accumulates the process information obtained this time, in the process information 530. For example, the flow control unit 111 registers the ID of the process information obtained this time as "process information" in the operation management record information recorded this time, so that the process information and the operation management record information are accumulated in association with each other.

With the above procedure, each time an operation component of the management flow 700 is performed, a record for the operation component is accumulated as the operation management record information 520 and process information 530 in the storage unit 120.

Figure 11:
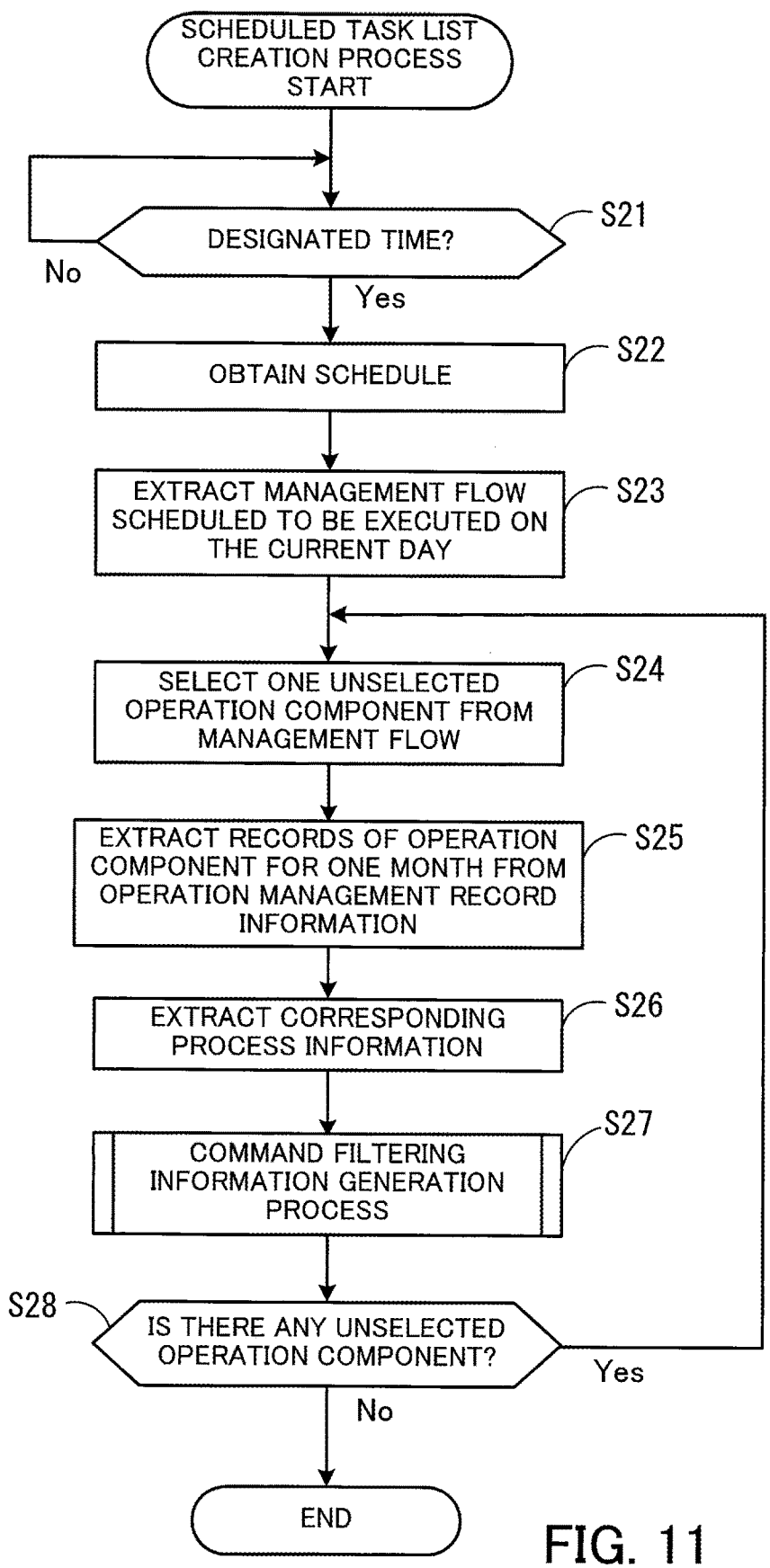
FIG. 11 illustrates a procedure for a scheduled task list creation process.

FIG. 11 illustrates a procedure for a scheduled task list creation process. The scheduled task list creation unit 131 creates a scheduled task list for each command that is scheduled to be executed during a predetermined time period. The following describes how to create a list of commands scheduled to be executed on the current day.

(Step S21) The scheduled task list creation unit 131 checks whether a designated start time of the scheduled task list creation process has come. If the designated start time has come, the procedure proceeds to step S22. If the designated start time has not come, the waiting state continues.

(Step S22) The scheduled task list creation unit 131 reads the schedule information 540 from the storage unit 120, and obtains a schedule for the management flow 700.

(Step S23) The scheduled task list creation unit 131 extracts a management flow scheduled to be performed on the current day, from the management flow 700. For example, the scheduled task list creation unit 131 extracts a management flow whose "scheduled activation time" in the schedule information 540a indicates that day.

(Step S24) The scheduled task list creation unit 131 selects one unselected operation component for which a scheduled task list is not yet created, from the operation components defined in the extracted management flow.

(Step S25) The scheduled task list creation unit 131 extracts the records of the selected operation component for one month from the operation management record information 520. The scheduled task list creation unit 131 searches for desired operation management record information on the basis of the "operation component ID" and "task start date and time" of the operation management record information 520a. In this connection, if the number of records for one month is less than a prescribed value, more previous records are extracted. If the number of records for one month is greater than the prescribed value, records with execution start dates and times closer to the current time are selected.

(Step S26) The scheduled task list creation unit 131 extracts process information associated with the operation management record information.

(Step S27) The scheduled task list creation unit 131 performs a command filtering information generation process to generate filtering criteria for determining whether the alert information 800 is due to a false detection, on the basis of the extracted operation management record information and process information. The command filtering information generation process will be described with reference to FIG. 12.

(Step S28) The scheduled task list creation unit 131 determines whether there is any unselected operation component whose command filtering information is not yet set. If such an unselected operation component is found, the procedure proceeds back to step S24 to perform the process for the unselected operation component. If no unselected operation component is found, the procedure is completed.

Figure 12:
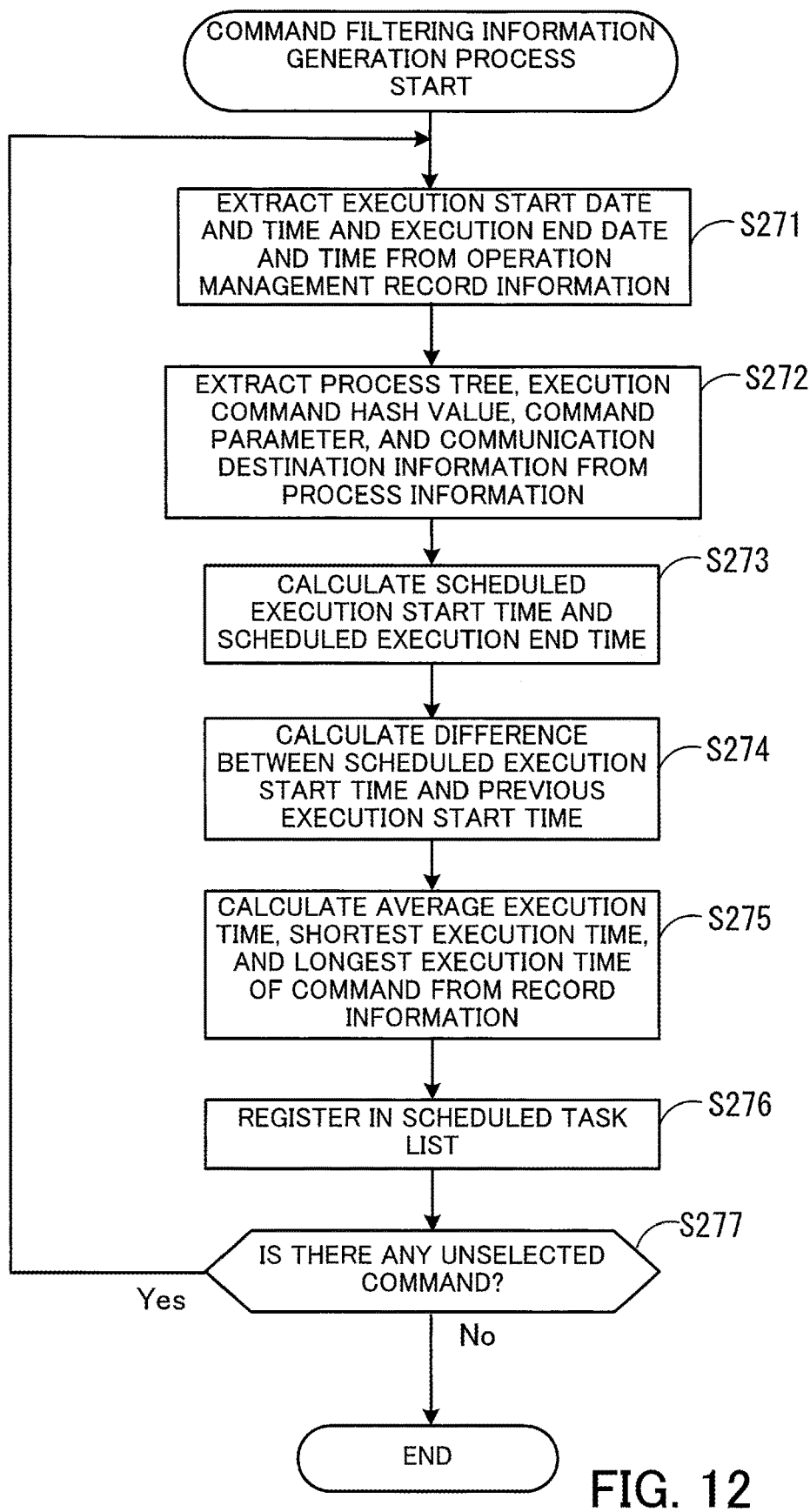
FIG. 12 illustrates a procedure for a command filtering information generation process.

FIG. 12 illustrates a procedure for a command filtering information generation process.

(Step S271) The scheduled task list creation unit 131 selects one execution command indicated in the operation management record information, and extracts the execution start date and time and execution end date and time of the selected execution command.

(Step S272) The scheduled task list creation unit 131 obtains the values registered in the "process tree", "execution command hash value", "command parameter", and "communication destination information" items corresponding to the execution command selected at step S271, from the extracted process information.

(Step S273) The scheduled task list creation unit 131 calculates the scheduled execution start time and scheduled execution end time, on the basis of the scheduled activation time of the corresponding management flow indicated in the schedule information and the "task start date and time" and "task end date and time" of the extracted operation management record information. The "task start date and time" and "task end date and time" of the operation management record information are the task start date and time and task end date and time of the operation component, and for example, the operation component is initiated at a fixed time every day.

(Step S274) The scheduled task list creation unit 131 calculates a difference between the calculated scheduled execution start time and the "task start date and time" of the operation management record information, and takes the difference as a start delay time indicating how much the start time may be delayed. The operation management record information includes information for a plurality of executions, and for example, the average value of the start delay times calculated for the individual executions may be taken as the start delay time.

(Step S275) The scheduled task list creation unit 131 calculates the average execution time, shortest execution time, and longest execution time for the command, on the basis of the "task start date and time" and "task end date and time" of the operation management record information.

(Step S276) The scheduled task list creation unit 131 registers the above extracted or calculated values in the scheduled task list 550.

(Step S277) The scheduled task list creation unit 131 checks whether there is any unselected command that is not registered in the scheduled task list 550. If such an unselected command is detected, the procedure proceeds to step S271. If no unselected command is detected, the procedure is completed. In this connection, if the detected command is for the same operation component, steps S273 to S275 may be omitted and previously calculated values may be used.

With the above procedure, the scheduled task list 550 that is used as filtering criteria for determining whether alert information 800 is due to a false detection is created. As described above, the scheduled task list 550 is automatically set on the basis of information detected when the management flow 700 is actually performed. This makes it possible to improve the accuracy of determining whether the alert information 800 is due to a false detection. In addition, the administrator does not need to define a filtering process in advance, which significantly reduces the burden on the administrator.

(2) Filtering Process

The following describes a filtering process using the scheduled task list 550.

Figure 13:
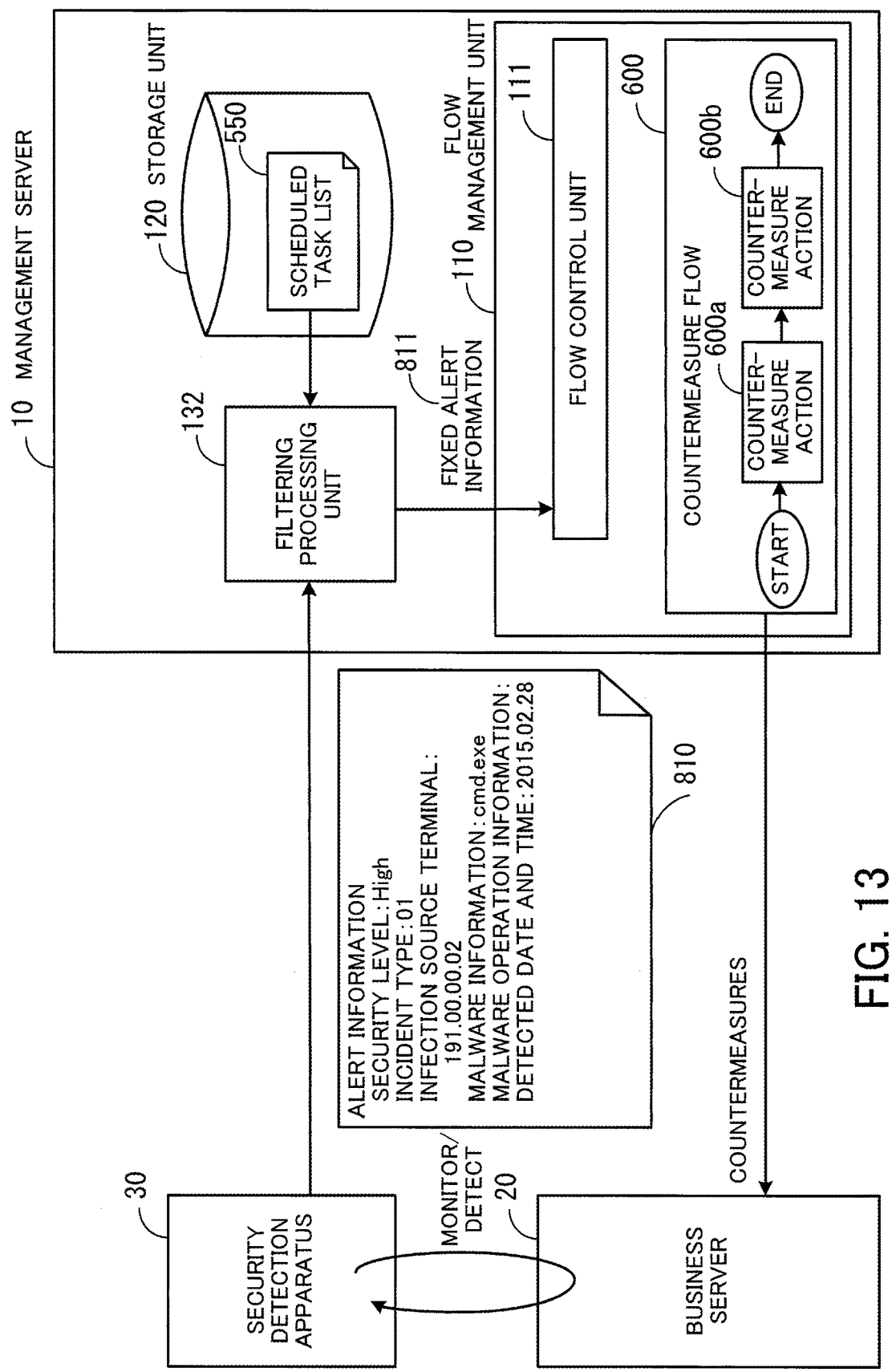
FIG. 13 illustrates a flow of information in a filtering process.

FIG. 13 illustrates a flow of information in the filtering process. FIG. 13 only illustrates a partial configuration related to the filtering process, out of the configuration of the management server 10 illustrated in FIG. 4.

A countermeasure flow 600 is defined as a combination of countermeasure actions 600*a* and 600*b* for countermeasures against a security incident. A plurality of different countermeasure flows 600 are prepared for different countermeasures against expected different security incidents.

The flow control unit 111 receives fixed alert information 811 from the filtering processing unit 132, and initiates the countermeasure flow 600 corresponding to a detected security incident indicated by the fixed alert information 811. The flow control unit 111 performs defined processes in the order of the countermeasure actions 600*a* and 600*b*, in accordance with the initiated countermeasure flow 600. For example, countermeasures are to instruct the business server 20 to disconnect from a network, terminate an application, investigate an impact range, or others.

The alert information 810 is one example of alert information that the security detection apparatus 30 sends to the management server 10 when detecting a security incident in the business server 20. The alert information 810 of FIG. 13 includes information on a security level, an incident type, an infection source terminal, malware information, malware operation information, and detected date and time. The security level is set by the security detection apparatus 30 for a security incident, and represented by High, Mid, Low, or another, for example. The incident type is set according to the detected content. For example, the content may be communication to an unauthorized URL/IP address, file transfer or downloading to an unauthorized communication destination, activation or manipulation of malicious applications, or another. As the infection source terminal, the IP address of a detected terminal is set. The malware information is about detected malware, and information indicating malware, information about a command or process, process tree information, and others is set. The malware operation information indicates an operation performed by the malware. The detected date and time indicate when an alert was detected.

The filtering processing unit 132 receives the alert information 810 and determines whether the alert information 810 is due to a false detection. In addition, before this determination, the filtering processing unit 132 may determine based on the security level indicated by the alert information 810 whether to take countermeasures. For example, assume that, if the alert information 810 indicates a Low security level, the alert is just recorded but any countermeasures are not performed. After confirming that the alert information indicates a security level exceeding a prescribed criterion in this way, the filtering processing unit 132 may determine whether the alert information 810 is due to a false detection. The filtering processing unit 132 compares the security incident identified by the incident type, infection source terminal, malware information, malware operation information, and detected date and time indicated by the alert information 810 against the scheduled task list 550 to determine whether they match. This determination process will be described in detail later with reference to FIG. 14. If the security incident matches the scheduled task list 550, the filtering processing unit 132 determines that the alert information 810 is due to a false detection. If the security incident does not match the scheduled task list 550, the filtering processing unit 132 determines that the alert information 810 is not due to a false detection, and then outputs the alert information 810 as fixed alert information 811 to the flow control unit 111.

As described above, when receiving alert information 810 from the security detection apparatus 30, the management server 10 determines whether the alert information 810 is due to a false detection, on the basis of the scheduled task list 550. Then, in response to fixed alert information 811, which is issued because it is not due to a false detection, the management server 10 initiates a countermeasure flow 600, thereby automatically taking countermeasures. This approach makes it possible to reduce the risk of taking countermeasures due to a false detection, and also possible to take countermeasures promptly.

Figure 14:
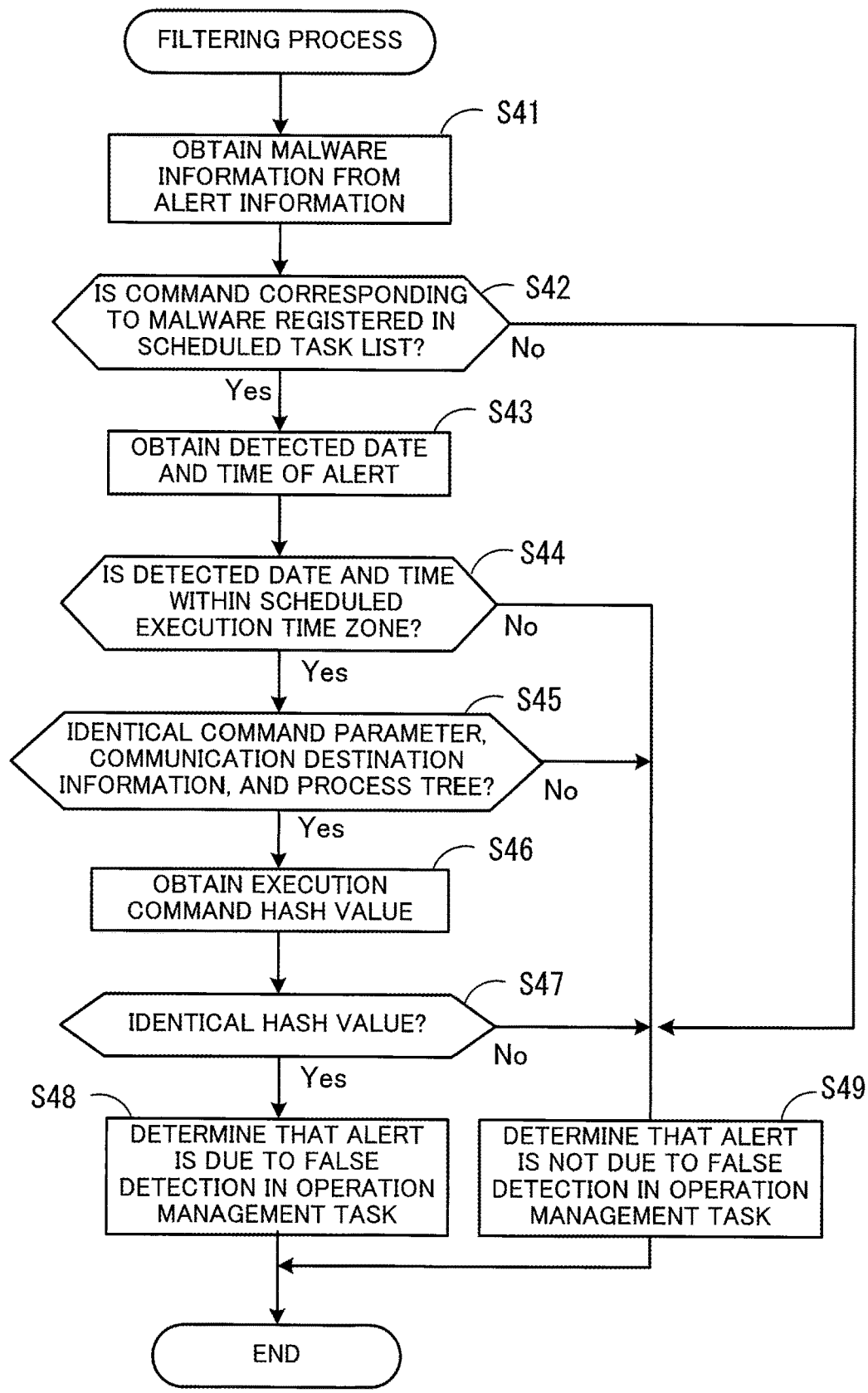
FIG. 14 illustrates a procedure for the filtering process.

FIG. 14 illustrates a procedure for a filtering process. The procedure of FIG. 14 is to determine whether a command from which an alert is detected is a scheduled command, after the security level check of the alert information 810 is complete.

(Step S41) The filtering processing unit 132 extracts malware information from the alert information 810.

(Step S42) The filtering processing unit 132 determines whether a command determined to be caused due to malware by the security detection apparatus 30 on the basis of the malware information is registered in the scheduled task list 550. If the command is registered, the procedure proceeds to step S43; otherwise, the procedure proceeds to step S49.

(Step S43) The filtering processing unit 132 obtains the detected date and time of the alert from the alert information 810.

(Step S44) The filtering processing unit 132 calculates a scheduled execution time zone on the basis of the scheduled execution start time, scheduled execution end time, start delay time, average execution time, shortest execution time, and longest execution time of the command of the scheduled task list 550. The scheduled execution time zone indicates a time zone in which the command is expected to be executed. For example, this time zone is from the scheduled execution start time to the time that is the longest execution time after the scheduled execution start time. The filtering processing unit 132 determines whether the detected date and time of the alert indicated in the alert information 810 is within the scheduled execution time zone. If the detected date and time of the alert is within the scheduled execution time zone, the procedure proceeds to step S45. If it is not within the scheduled execution time zone, the procedure proceeds to step S49.

(Step S45) The filtering processing unit 132 determines whether the command parameter, communication destination information, process tree indicated in the malware operation information of the alert information 810 matches the information about the command registered in the scheduled task list 550. If they match, the procedure proceeds to step S46; otherwise, the procedure proceeds to step S49.

(Step S46) The filtering processing unit 132 obtains the execution command hash value for which the alert has been detected, from the business server 20 on the basis of the alert information 810.

(Step S47) The filtering processing unit 132 compares the execution command hash value obtained from the business server 20 with the execution command hash value of the same command registered in the scheduled task list 550. If they match, the procedure proceeds to step S48; otherwise, the procedure proceeds to step S49.

(Step S48) Since the alert information 810 matches all information registered for the same command in the scheduled task list 550, the filtering processing unit 132 determines that the alert is due to a false detection in the operation management task, and then the procedure is completed.

(Step S49) The filtering processing unit 132 determines that the alert information 810 is not due to a false detection in the operation management task, and then the procedure is completed.

As described above, the management server 10 previously stores the scheduled task list 550 for determining whether an executed command is scheduled to be executed in an operation management task, on the basis of execution information obtained from the business server 20 that has performed the operation management task. Then, the management server 10 determines based on the scheduled task list 550 whether the alert information 810 is due to a false detection in the operation management task. In this way, the determination is made based on the actually obtained execution information, so that it is possible to improve the accuracy of determining whether the alert information 810 is due to a false detection. Especially, the determination may be made based on a plurality of detected items included in the alert information 810, including a command parameter, communication destination information, and process tree, and others, which makes it possible to improve the accuracy of the determination. In addition, countermeasures for the alert information 810 may include, for example, disconnecting from a network, terminating an application. These countermeasures have a great impact on business service provided by the business server 20. Especially, if the alert information 810 is due to a false detection, the business server 20 that operates normally is stopped. This is a great loss on business. If the alert information 810 is not due to a false detection, a damage may be serious if any countermeasures are not taken promptly. The management server 10 of the embodiment provides an improved reliability of determining whether the alert information 810 is due to a false detection, reduces the risk of performing countermeasures based on a false detection, and takes countermeasures promptly when the alert information 810 is not due to a false detection.

The following describes how the management server 10 operates in the case of receiving alert information due to a false detection in an operation management task and in the case of receiving alert information due to a security incident.

Figure 15:
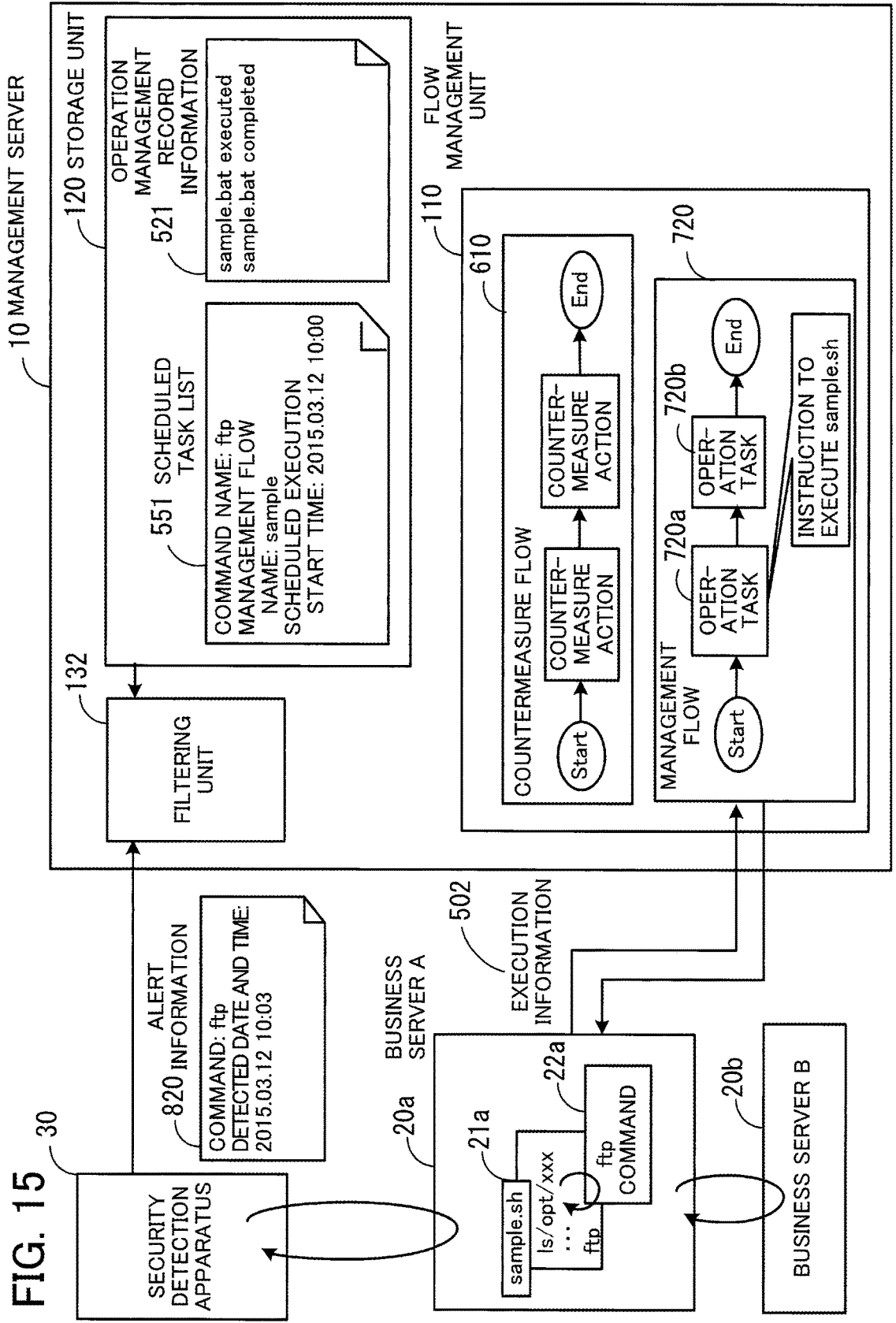
FIG. 15 illustrates an exemplary case where a security alert is issued in an operation management process.

FIG. 15 illustrates an exemplary case where a security alert is issued in an operation management task. FIG. 15 illustrates only a partial configuration related to the alert process of FIG. 15, out of the configuration of the management server 10 of FIG. 4.

The flow management unit 110 of the management server 10 performs an operation management task for the business server A (20*a*) in accordance with a management flow 720. The flow management unit 110 sequentially executes operation components (tasks) 720*a* and 720*b* defined in the management flow 720. The operation component 720*a* defines "instruction to execute sample.sh". The flow management unit 110 initiates the management flow 720 at the activation time registered in schedule information 540. The operation component 720*a* of the management flow 720 instructs the business server A (20*a*) to execute "sample.sh", and thereby the business server A (20*a*) activates "sample.sh (21*a*)". In the execution of sample.sh (21*a*), the business server A (20*a*) activates a ftp command 22*a* in accordance with the structure of a process tree. After the command ends, the business server A (20*a*) sends execution information 502 about the executed "sample.sh" to the flow management unit 110. The execution information 502 includes an execution start date and time, an execution end date and time, the process tree, a command parameter, an execution command hash value, communication destination information, and others with respect to the execution of the ftp command 22*a*. When the management flow 720 is completed, the flow management unit 110 accumulates an operation record of "sample.bat executed" and "sample.bat completed" with respect to the management flow in the operation management record information 521. In addition, the flow management unit 110 accumulates the content of the execution information 502 in the process information 530. The scheduled task list creation unit 131 creates a scheduled task list 551 on the basis of the operation management record information 521, process information 530, and schedule information 540. Referring to the example of FIG. 15, the command name "ftp", management flow name "sample", and scheduled execution start time "2015.03.12 10:00" with respect to the executed command are registered in the scheduled task list 551.

Under this situation, when the activation time of the management flow 720 comes, the management flow 720 instructs the business server A (20*a*) to activate "sample.sh". The business server A (20*a*) activates sample.sh (21*a*), and performs file transfer to a business server B (20*b*) in response to the ftp command 22*a*. This execution of the ftp command 22*a* is regarded as file transfer to an external device, and the security detection apparatus 30 notifies the management server 10 of alert information 820. The alert information 820 includes information indicating that the security incident based on "command: ftp" was detected at the "detected date and time of 2015.03.12 10:03". The filtering processing unit 132 receives the alert information 820, and determines whether information corresponding to the command is registered in the scheduled task list 551. Since "command name: ftp" is scheduled to be executed at "scheduled execution start time of 2015.03.12 10:00", it is determined that the alert information 820 relates to the scheduled command. Since the filtering processing unit 132 determines that the alert information 820 is due to a false detection, the filtering processing unit 132 does not output fixed alert information to the flow management unit 110. This prevents a countermeasure flow 610 from being initiated due to the alert information 820 based on a false detection.

For comparison, the following describes a conventional case where the scheduled task list 551 is not created. When receiving the alert information 820, the filtering processing unit 132 uses the operation management record information 521 to determine whether the alert information 820 is due to a false detection. This is because there is no scheduled task list 551. The operation management record information 521 merely includes records indicating the start of the management flow, but does not indicate which commands have been executed. Since information about commands is not included, the filtering processing unit 132 determines that the alert information 820 is not due to a false detection, and therefore notifies the flow management unit 110 of the alert information 820. Thereby, a countermeasure flow 610 is performed. In this way, if the scheduled task list 551 is not created, it may not be determined correctly whether the alert information 820 is due to a false detection. In this case, countermeasures may be taken although they are not needed actually, thereby stopping the business. To avoid unneeded execution of countermeasures, an administrator may be relied on to determine whether to take countermeasures.

Figure 16:
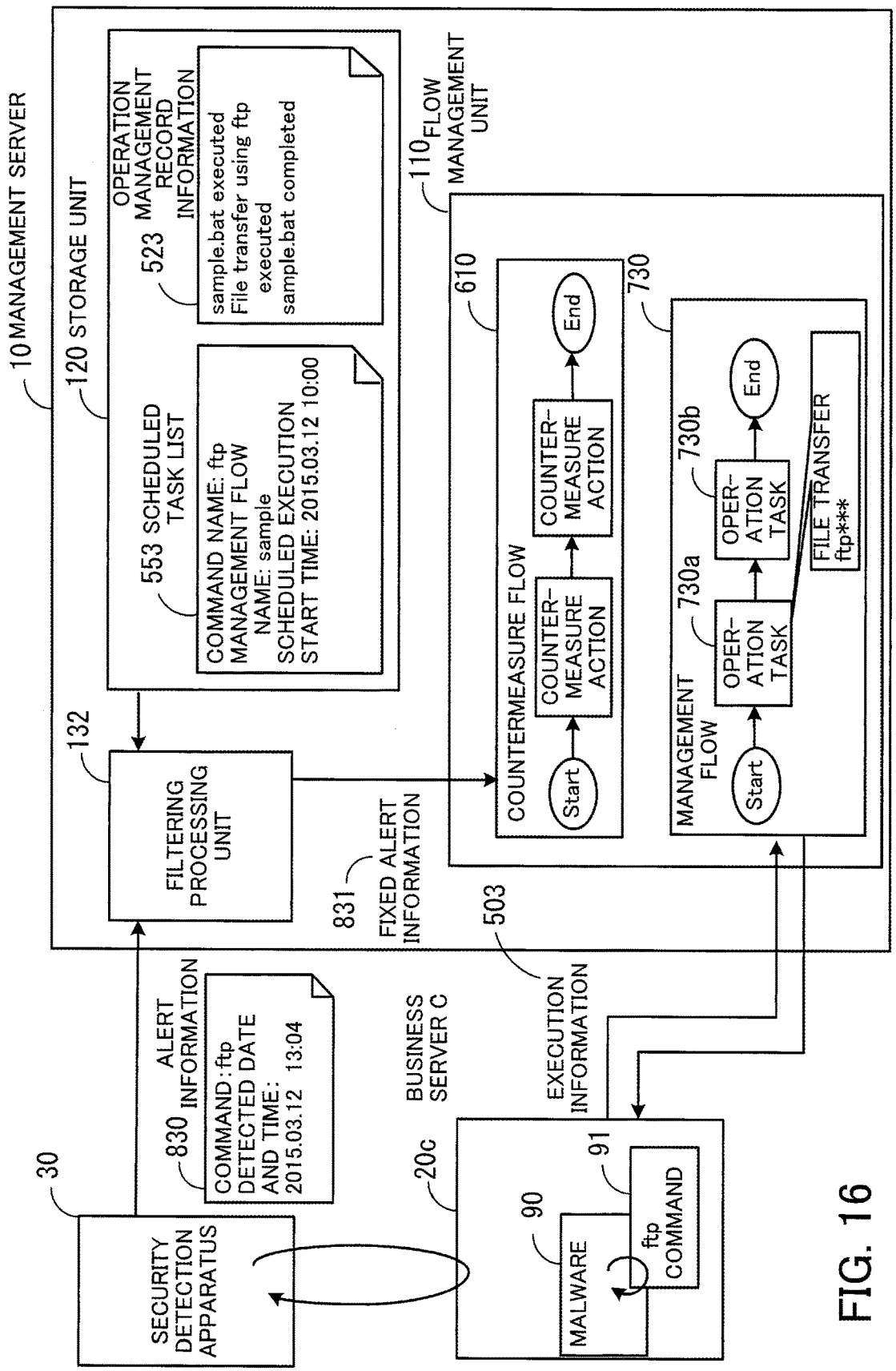
FIG. 16 illustrates an exemplary case where a security alert is issued due to malware.

The following describes how the system operates in the case where a security incident occurs. FIG. 16 illustrates an exemplary case where a security alert is issued due to malware. FIG. 16 illustrates only a partial configuration related to the alert process of FIG. 16, out of the configuration of the management server 10 of FIG. 4.

The flow management unit 110 of the management server 10 performs operation management tasks in accordance with a management flow 730. The flow management unit 110 sequentially executes operation components (tasks) 730*a* and 730*b* defined in the management flow 730. The operation component 730*a* defines an instruction to execute "file transfer ftp\*\*\*". The flow management unit 110 initiates the management flow 730 at the activation time registered in schedule information 540. The operation component 730*a* of the management flow 730 instructs a business server C (20*c*) to execute "file transfer ftp\*\*\*", and the business server C (20*c*) performs the file transfer. Referring to the example of FIG. 16, it is assumed that "file transfer using ftp executed" is registered in operation management record information 523. In addition, it is assumed that a command name "ftp", management flow name "sample", and scheduled execution start time "2015.03.12 10:00" are registered with respect to a scheduled command in a scheduled task list 553.

Under this situation, it is assumed that the malware 90 hacking into the business server C (20*c*) activates an ftp command 91 and executes file transfer to another device. This ftp command 91 is regarded as file transfer to an external device, and the security detection apparatus 30 sends alert information 830 to the management server 10. The alert information 830 includes information indicating that the security incident based on the "command: ftp" was detected at the "detected date and time of 2015.03.12 13:04". The filtering processing unit 132 obtains the alert information 830, and determines whether information corresponding to this command is registered in the scheduled task list 553. In this situation, command names match but the detected date and time do not match the scheduled execution start time, and therefore it is determined that the alert does not relate to the scheduled command. Therefore, the filtering processing unit 132 determines that the alert information 830 is not due to a false detection, and then outputs fixed alert information 831 to the flow management unit 110. Thereby, a countermeasure flow 610 is initiated.

For comparison, the following describes a conventional case where the scheduled task list 553 is not created. When receiving the alert information 830, the filtering processing unit 132 uses the operation management record information 523 to determine whether the alert information 830 is due to a false detection. This is because there is no scheduled task list 553. Referring to the example of FIG. 16, the operation management record information 523 includes information about commands but does not include the scheduled execution start times of the commands. For example, a long time zone is considered if a comparison is made with the start and end times of the management flow 730. Therefore, a command may be erroneously detected as a command based on an instruction from the management server 10. Then, the filtering processing unit 132 determines that the alert information 830 is due to a false detection, and a countermeasure flow 610 is not performed. Therefore, if the scheduled task list 553 is not created, it may not be determined correctly whether the alert information 830 is due to a false detection. In this case, any countermeasures are not taken although they are needed, and the malware 90 remains.

As described above, the second embodiment determines based on actual operation records of operation management tasks whether alert information is due to a false detection, i.e., relates to an operation management task determined as an alert by error. This approach makes it possible to improve the accuracy of detecting a false detection. The improvement in accuracy leads to a reduction in the risk of initiating a countermeasure flow due to a false detection. This approach eliminates the need of administrator's determination on whether to take countermeasures, and thus achieves fast processing.

The above processing functions may be implemented by a computer. In this case, a program describing the processing content of the functions implemented by a management apparatus is provided. The processing functions are implemented by causing the computer to run the program. The program describing the processing content may be recorded on a computer-readable recording medium. Computer-readable recording media include magnetic storage devices, optical discs, magneto-optical recording media, and semiconductor memories. Magnetic storage devices include hard disk drives (HDD), flexible disks (FD), and magnetic tapes. Optical discs include DVD, DVD-RAM, CD-ROM, and CD-RW. Magneto-optical recording media include Magneto-optical disks (MO).

For example, to distribute the program, portable recording media, such as DVD and CD-ROM, on which the program is recorded may be put on sale. Alternatively, the program may be stored in a storage device of a server computer, and may be transferred from the server computer to other computers over a network.

A computer that runs the program may store the program recorded in a portable recording medium or the program received from the server computer in a local storage device. Then, the computer reads the program from the local storage device, and performs processes in accordance with the program. In this connection, the computer may read the program directly from the portable recording medium, and then perform processes in accordance with the program. Alternatively, the computer may perform processes in accordance with the program while receiving the program from the server computer over a network.

Further, at least part of the above processing functions may be implemented by using DSP, ASIC, PLD, or other electronic circuits.

According to one embodiment, it is possible to improve the accuracy of determining whether alert information is due to a false detection.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
   obtaining execution information about a first process generated or a first command executed by an information processing apparatus that performs a task in response to an execution instruction for executing the task, the execution information including an execution start time and an execution end time of the first process or the first command executed by the information processing apparatus;
   accumulating the execution start time and the execution end time of the first process or the first command as record information;
   creating a scheduled task list of the first process or the first command that the information processing apparatus is scheduled to execute during a predetermined time period, based on the execution information obtained about the first process or the first command, as well as based on a schedule of the execution instruction for the task;
   receiving alert information including information about a second process being generated or a second command being executed by the information processing apparatus when a security incident indicating an unauthorized action is detected in the information processing apparatus;
   calculating a scheduled execution time zone in which the first process or the first command is expected to be executed, based on the scheduled task list, the schedule, and the record information, and comparing detected date and time of the second process or the second command indicated by the alert information against the scheduled execution time zone;
   determining whether or not the detected date and time of the second process or the second command is included in the scheduled execution time zone calculated based on the scheduled task list that has been created based on the execution information and the schedule; and
   discarding the received alert information when the determining concludes that the detected date and time of the second process or the second command is included in the scheduled execution time zone.

2. The non-transitory computer-readable recording medium according to claim 1, wherein:
   the execution information includes process tree information about a process tree of the first process or the first command executed by the information processing apparatus in response to the execution instruction;
   the process further includes comparing malware information indicating a process tree of the second process or the second command with the process tree information of the first process or the first command registered in the scheduled task list to determine whether or not the second process has been generated in response to the execution instruction, the malware information being included in the alert information; and
   the process further includes comparing the malware information with the process tree information of the first process or the first command registered in the scheduled task list to determine whether or not the second command has been executed in response to the execution instruction.

3. The non-transitory computer-readable recording medium according to claim 1, wherein:
   the execution information includes a hash value of a first module activated by the first process or the first command executed by the information processing apparatus in response to the execution instruction; and
   the process further includes obtaining a hash value of a second module activated by the second process or the second command identified based on malware information included in the alert information, and comparing the hash value of the second module with the hash value of the first module registered in the scheduled task list to determine whether or not the second process or the second command has been generated or executed in response to the execution instruction.

4. The non-transitory computer-readable storage medium according to claim 1, wherein:
   the execution information includes communication destination information of a communication process performed by the first process or the first command executed by the information processing apparatus in response to the execution instruction; and
   the process further includes comparing communication destination information of a communication process performed by the second process or the second command indicated by the alert information with the communication destination information of the communication process performed by the first process or the first command registered in the scheduled task list, to determine whether or not the second process or the second command has been generated or executed in response to the execution instruction.

5. A management apparatus comprising:
a processor configured to perform a process including;
obtaining execution information about a first process generated or a first command executed by an information processing apparatus that performs a task in response to an execution instruction for executing the task, the execution information including an execution start time and an execution end time of the first process or the first command executed by the information processing apparatus;
accumulating the execution start time and the execution end time of the first process or the first command as record information;
creating a scheduled task list of the first process or the first command that the information processing apparatus is scheduled to execute during a predetermined time period, based on the execution information obtained about the first process or the first command, as well as based on a schedule of the execution instruction for the task;
receiving alert information including information about a second process being generated or a second command being executed by the information processing apparatus when a security incident indicating an unauthorized action is detected in the information processing apparatus;
calculating a scheduled execution time zone in which the first process or the first command is expected to be executed, based on the scheduled task list, the schedule, and the record information, and comparing detected date and time of the second process or the second command indicated by the alert information against the scheduled execution time zone;
determining whether or not the detected date and time of the second process or the second command is included in the scheduled execution time zone calculated based on the scheduled task list that has been created based on the execution information and the schedule; and
discarding the received alert information when the determining concludes that the detected date and time of the second process or the second command is included in the scheduled execution time zone.

6. A management method comprising:
obtaining, by a processor, execution information about a first process generated or a first command executed by an information processing apparatus that performs a task in response to an execution instruction for executing the task, the execution information including an execution start time and an execution end time of the first process or the first command executed by the information processing apparatus;
accumulating, by the processor, the execution start time and the execution end time of the first process or the first command as record information;
creating, by the processor, a scheduled task list of the first process or the first command that the information processing apparatus is scheduled to execute during a predetermined time period, based on the execution information obtained about the first process or the first command, as well as based on a schedule of the execution instruction for the task;
receiving, by the processor, alert information including information about a second process being generated or a second command being executed by the information processing apparatus when a security incident indicating an unauthorized action is detected in the information processing apparatus;
calculating, by the processor, a scheduled execution time zone in which the first process or the first command is expected to be executed, based on the scheduled task list, the schedule, and the record information, and comparing detected date and time of the second process or the second command indicated by the alert information against the scheduled execution time zone;
determining, by the processor, whether or not the detected date and time of the second process or the second command is included in the scheduled execution time zone calculated based on the scheduled task list that has been created based on the execution information and the schedule; and
discarding, by the processor, the received alert information when the determining concludes that the detected date and time of the second process or the second command is included in the scheduled execution time zone.

* * * * *